(12) United States Patent
You et al.

(10) Patent No.: US 10,747,408 B2
(45) Date of Patent: Aug. 18, 2020

(54) DISPLAY APPARATUS AND SERVER APPARATUS PROVIDING FEEDBACK USER INTERFACE

(71) Applicant: SAMSUNG ELECTRONICS CO., LTD., Suwon-si (KR)

(72) Inventors: So-yon You, Seoul (KR); Hee-won Ku, Seoul (KR); Young-in Park, Gunpo-si (KR); Hee-kyoung Seo, Suwon-si (KR); Youn-ji Shim, Seoul (KR); Sung-jun Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 809 days.

(21) Appl. No.: 14/538,279

(22) Filed: Nov. 11, 2014

(65) Prior Publication Data

US 2015/0135070 A1    May 14, 2015

(30) Foreign Application Priority Data

Nov. 11, 2013 (KR) .................. 10-2013-0136006
Nov. 13, 2013 (KR) .................. 10-2013-0137521
Apr. 30, 2014 (KR) .................. 10-2014-0052267

(51) Int. Cl.
*G06F 3/0484* (2013.01)
*H04N 5/445* (2011.01)
(Continued)

(52) U.S. Cl.
CPC ........ *G06F 3/04842* (2013.01); *G06F 3/0485* (2013.01); *G06Q 30/0203* (2013.01);
(Continued)

(58) Field of Classification Search
CPC ............. G06F 3/04842; G06F 3/0485; G06Q 30/0203; H04N 5/44582; H04N 21/4312;
(Continued)

(56) References Cited

U.S. PATENT DOCUMENTS 6,169,543 B1 * 1/2001 Wehmeyer ......... H04N 5/44543
                                                          348/564
6,216,263 B1 * 4/2001 Elam ...................... H04N 7/163
                                                          348/E7.061
(Continued)

FOREIGN PATENT DOCUMENTS

KR    10-2007-0004153 A    1/2007
WO       2008/030298 A2    3/2008

OTHER PUBLICATIONS

Search Report dated Feb. 4, 2015, issued by the International Searching Authority in counterpart International Application No. PCT/KR2014/010778.

(Continued)

*Primary Examiner* — Jung-Mu T Chuang
(74) *Attorney, Agent, or Firm* — Sughrue Mion, PLLC

(57) ABSTRACT

A display apparatus is disclosed. The display apparatus includes a display to display contents on a screen and a controller to control the display to display a feedback user interface (UI) on the screen which is generated based on a user preference of the contents, and the feedback UI may include at least one of a poll UI which is related to the contents or a control UI that is used to control playback timing of the contents.

19 Claims, 27 Drawing Sheets

(51) Int. Cl.
  *H04N 21/472*    (2011.01)
  *H04N 21/431*    (2011.01)
  *H04N 21/475*    (2011.01)
  *G06Q 30/02*     (2012.01)
  *G06F 3/0485*    (2013.01)
  *H04N 21/4788*   (2011.01)
  *H04N 21/482*    (2011.01)
  *H04N 21/45*     (2011.01)

(52) U.S. Cl.
  CPC ..... *H04N 5/44582* (2013.01); *H04N 21/4312* (2013.01); *H04N 21/4316* (2013.01); *H04N 21/4532* (2013.01); *H04N 21/4755* (2013.01); *H04N 21/4756* (2013.01); *H04N 21/4788* (2013.01); *H04N 21/47217* (2013.01); *H04N 21/482* (2013.01)

(58) Field of Classification Search
  CPC ........... H04N 21/4316; H04N 21/4532; H04N 21/4755; H04N 21/4756; H04N 21/4788; H04N 21/482
  See application file for complete search history.

(56) References Cited

U.S. PATENT DOCUMENTS

| | | | | |
|---|---|---|---|---|
| 6,631,522 | B1* | 10/2003 | Erdelyi | G06F 17/30793 348/E7.061 |
| 7,318,196 | B2* | 1/2008 | Crow | G06F 3/048 715/716 |
| 7,383,508 | B2* | 6/2008 | Toyama | G06F 3/0481 348/E5.067 |
| 7,783,646 | B2* | 8/2010 | Hamilton, II | A63F 13/00 705/12 |
| 7,904,814 | B2 | 3/2011 | Errico et al. | |
| 8,132,200 | B1* | 3/2012 | Karam | G06F 17/30846 725/13 |
| 8,181,197 | B2* | 5/2012 | Badoiu | G06Q 30/02 725/24 |
| 8,346,067 | B2* | 1/2013 | Issa | H04N 5/783 386/343 |
| 8,351,765 | B2* | 1/2013 | Ismail | H04N 5/44543 386/291 |
| 8,627,476 | B1* | 1/2014 | Satish | G06F 21/51 713/187 |
| 8,704,760 | B2* | 4/2014 | Kang | G06F 3/011 345/156 |
| 8,774,596 | B2* | 7/2014 | Kurupacheril | H04N 5/76 386/241 |
| 8,838,826 | B2* | 9/2014 | Galanes | H04N 21/23116 709/231 |
| 8,839,327 | B2* | 9/2014 | Amento | H04N 21/47202 725/110 |
| 8,843,484 | B2* | 9/2014 | Gu | G06Q 30/0201 707/734 |
| 9,218,101 | B2* | 12/2015 | Fleischman | G06F 3/0482 |
| 9,326,035 | B1* | 4/2016 | Thompson | H04N 21/482 |
| 9,354,763 | B2* | 5/2016 | Latulipe | G06F 3/048 |
| 9,400,995 | B2* | 7/2016 | Gu | G06Q 30/0201 |
| 9,912,712 | B2* | 3/2018 | McCoy | H04N 21/4333 |
| 10,095,367 | B1* | 10/2018 | Berry | G06F 3/048 |
| 2003/0093790 | A1* | 5/2003 | Logan | G06F 17/30265 725/38 |
| 2003/0128228 | A1* | 7/2003 | Crow | G06F 3/048 715/716 |
| 2003/0135605 | A1* | 7/2003 | Pendakur | H04N 7/173 709/224 |
| 2005/0204386 | A1* | 9/2005 | Ismail | H04N 5/44543 725/46 |
| 2006/0146056 | A1* | 7/2006 | Wyatt | G09G 5/006 345/501 |
| 2006/0218573 | A1* | 9/2006 | Proebstel | H04H 60/33 725/14 |
| 2007/0083897 | A1* | 4/2007 | Brownell | G11B 27/105 725/61 |
| 2007/0146820 | A1* | 6/2007 | Asazu | H04H 60/27 358/479 |
| 2007/0174862 | A1* | 7/2007 | Kushida | H04H 60/33 725/15 |
| 2007/0204298 | A1* | 8/2007 | Shanks | H04H 60/31 725/43 |
| 2007/0299685 | A1* | 12/2007 | Marsh | G06F 17/30038 725/39 |
| 2008/0092168 | A1* | 4/2008 | Logan | G10H 1/0033 725/44 |
| 2009/0106202 | A1* | 4/2009 | Mizrahi | G06F 16/9566 |
| 2009/0187859 | A1* | 7/2009 | Tuerk | G06F 9/4443 715/834 |
| 2009/0199251 | A1* | 8/2009 | Badoiu | G06Q 30/02 725/105 |
| 2009/0328122 | A1* | 12/2009 | Amento | A63F 13/53 725/114 |
| 2010/0199295 | A1* | 8/2010 | Katpelly | H04L 67/306 725/14 |
| 2010/0333142 | A1* | 12/2010 | Busse | H04N 7/17318 725/47 |
| 2011/0022462 | A1* | 1/2011 | Collins | G06Q 30/02 705/14.49 |
| 2011/0113151 | A1* | 5/2011 | Nakamura | H04N 5/765 709/231 |
| 2011/0289431 | A1 | 11/2011 | Olumoko et al. | |
| 2011/0302240 | A1* | 12/2011 | Saito | G06F 17/30867 709/203 |
| 2011/0321107 | A1* | 12/2011 | Banks | H04N 21/234363 725/110 |
| 2012/0039578 | A1* | 2/2012 | Issa | H04N 5/783 386/205 |
| 2012/0117601 | A1* | 5/2012 | Yeh | H04N 21/4725 725/42 |
| 2012/0124136 | A1* | 5/2012 | Kim | H04W 4/021 709/204 |
| 2012/0209961 | A1* | 8/2012 | McCoy | H04N 21/4333 709/219 |
| 2012/0317085 | A1 | 12/2012 | Green et al. | |
| 2012/0317136 | A1* | 12/2012 | Papish | G06F 17/30035 707/769 |
| 2013/0046772 | A1* | 2/2013 | Gu | G06Q 30/0201 707/751 |
| 2013/0067491 | A1* | 3/2013 | Rose | G06Q 10/10 719/318 |
| 2013/0086489 | A1* | 4/2013 | Fleischman | H04N 21/4668 715/753 |
| 2013/0132985 | A1* | 5/2013 | Howcroft | H04N 5/44591 725/13 |
| 2013/0139211 | A1* | 5/2013 | Gorti | H04H 20/38 725/112 |
| 2013/0204871 | A1* | 8/2013 | Wong | G06F 17/30867 707/732 |
| 2013/0238616 | A1* | 9/2013 | Rose | G06F 3/048 707/732 |
| 2013/0262575 | A1* | 10/2013 | Xiong | H04N 21/254 709/204 |
| 2013/0309978 | A1* | 11/2013 | Weng | H04H 40/45 455/67.11 |
| 2014/0009680 | A1* | 1/2014 | Moon | H04N 21/4316 348/563 |
| 2014/0032358 | A1* | 1/2014 | Perkowitz | G06F 17/2785 705/26.7 |
| 2014/0161417 | A1* | 6/2014 | Kurupacheril | H04N 5/76 386/241 |
| 2014/0173660 | A1* | 6/2014 | Correa | H04N 21/25866 725/42 |
| 2014/0233921 | A1* | 8/2014 | Asazu | H04H 60/27 386/296 |
| 2014/0297479 | A1* | 10/2014 | McCloskey | G06Q 30/0627 705/26.63 |
| 2015/0007227 | A1* | 1/2015 | Yao | H04N 21/23418 725/38 |

(56) References Cited

U.S. PATENT DOCUMENTS

| | | | | |
|---|---|---|---|---|
| 2015/0032814 A1* | 1/2015 | Broustas | ............... | H04L 67/22 709/204 |
| 2015/0081442 A1* | 3/2015 | Nelson | ............... | G06Q 30/0257 705/14.55 |
| 2015/0095949 A1* | 4/2015 | Kim | ............... | H04N 21/4826 725/35 |
| 2015/0135070 A1* | 5/2015 | You | ............... | G06F 3/0485 715/716 |
| 2015/0156548 A1* | 6/2015 | Sirpal | ............... | H04N 21/4858 725/47 |
| 2015/0208135 A1* | 7/2015 | Sirpal | ............... | H04N 21/4858 725/40 |
| 2016/0041998 A1* | 2/2016 | Hall | ............... | G06F 17/30106 707/725 |
| 2016/0080815 A1* | 3/2016 | Ruffini | ............... | H04N 21/4755 725/46 |
| 2017/0064353 A1* | 3/2017 | Kim | ............... | H04N 21/252 |
| 2017/0076005 A1* | 3/2017 | Saito | ............... | G06Q 30/02 |

OTHER PUBLICATIONS

Written Opinion dated Feb. 4, 2015, issued by the International Searching Authority in counterpart International Application No. PCT/KR2014/010778.
Communication dated Jan. 26, 2017, issued by the European Patent Office in counterpart European Patent Application No. 14861035.5.
Communication dated Jul. 3, 2018, issued by the European Patent Office in counterpart European Application No. 14861035.5.
Communication dated Sep. 12, 2019, issued by the European Patent Office in counterpart European Application No. 14861035.5.
Communication dated Mar. 2, 2020 issued by the European Intellectual Property Office in counterpart European Application No. 14 861 035.5.
Communication dated Apr. 9, 2020 issued by the Korean Intellectual Property Office in counterpart Korean Application No. 10-2014-0052267.

* cited by examiner

1000

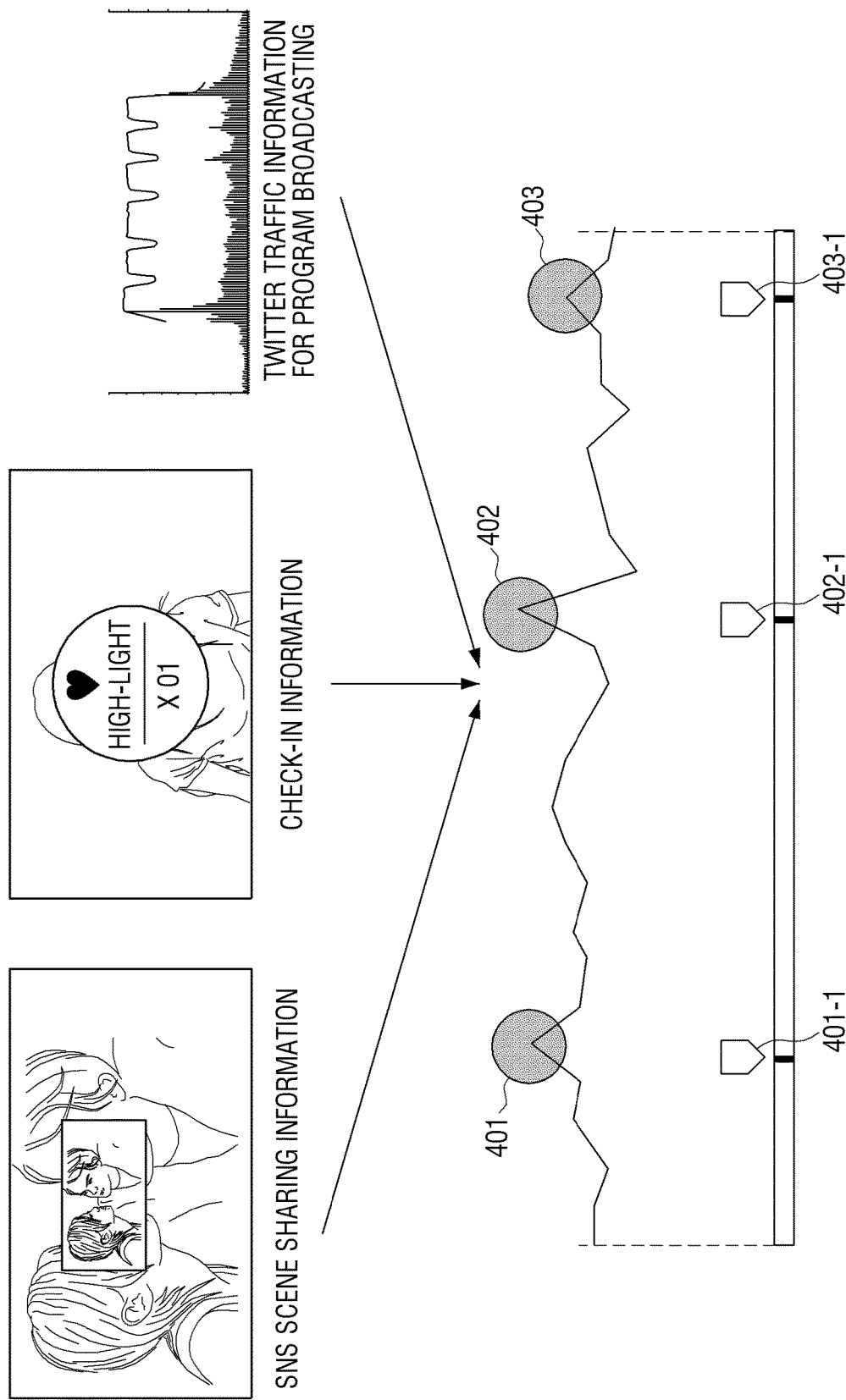

DISPLAY APPARATUS AND SERVER APPARATUS PROVIDING FEEDBACK USER INTERFACE

CROSS-REFERENCE TO RELATED APPLICATION(S)

This application claims priority from Korean Patent Application No. 10-2013-0136006, filed on Nov. 11, 2013, Korean Patent Application No. 10-2013-0137521, filed on Nov. 13, 2013, and Korean Patent Application No. 10-2014-0052267, filed on Apr. 30, 2014, in the Korean Intellectual Property Office, the disclosures of which are incorporated herein in their entirety by reference.

BACKGROUND

1. Field

Apparatuses and methods consistent with exemplary embodiments relate to a display apparatus, a server apparatus, and a controlling method thereof, and more particularly, to a display apparatus which provides content information based on user preference.

2. Description of Related Art

Due to the development of electronic technologies, various types of display apparatuses are being developed. For example, a display apparatus such as a television (TV), a personal computer (PC), a laptop computer, a tablet PC, a mobile phone, an MP3 player, and the like, are widely used in most households.

In an effort to satisfy a user's needs to use more advanced and various functions, the development of a display apparatus having a new format is being sought. For example, related-art TVs may receive only a broadcasting signal, and a user may view the broadcast contents. As another example, TVs also provide bilateral services via the internet. Accordingly, TV viewers can experience, via a TV, various functions such as web surfing, viewing a video on demand (VOD), social network services (SNS), games, and the like. Accordingly, content providers (CPs) may create income by providing users of a display apparatus with various contents, and users may purchase various contents through the display apparatus.

The CPs which provide contents to a display apparatus are trying to provide contents that are interesting to users, in order to make users of a display apparatus purchase the contents.

Users also wish to receive contents that they are interested in and in which they know other users' opinions about the contents. The opinions of other users may be used for other users to decide whether or not to purchase contents.

However, there is a need to expand the functions through which users may express their user preference on contents provided by a display apparatus and receive various services according to the expressed user preference.

SUMMARY

Exemplary embodiments provide a display apparatus that may provide a feedback user interface (UI) about contents based on user preference information, a server apparatus, and a controlling method thereof.

According to an aspect of an exemplary embodiment, there is provided a display apparatus including a display configured to display contents on a screen, and a controller configured to control the display to display a feedback user interface (UI) on the screen which is generated based on a user preference of the contents, wherein the feedback UI comprises at least one of a poll UI which is related to the contents or a control UI that is used to control playback timing of the contents.

The controller may control the display to display the control UI which includes a time bar to control content playback timing of contents and a graphical user interface (GUI) which is preset at a time which corresponds to at least one scene of the contents, in which the preset GUI may include information about a user preference of at least one scene of the contents.

The display apparatus may further include a user interface which receives a user interaction, and the controller may control a playback state of the contents so that the contents jump to a time when the preset GUI is displayed according to the user interaction.

The user interaction may be a user pressing a direction key provided on a remote controller.

The information about the user preference may include a number of users that have expressed a preference on at least one scene of the contents.

The user preference may be measured based on at least one of a social networking service (SNS) sharing information on each scene of the contents and user interaction information indicating the user preference.

The at least one scene may be detected based on at least one of the user preference being greater than a preset criterion or the user preference increasing more than a preset ratio.

In response to the at least one scene being a preset image area, the controller may control the display to display the preset GUI at a starting point of the image area and display the image area to be distinguished from another image area.

The display apparatus may further include a communicator that may communicate with an external server, and the controller may control the communicator to receive, from the external server, information about at least one scene and a number of empathic users based on user preference on each scene of the contents, calculate a jumping point on the time bar based on the received information, and display the GUI on the calculated jumping point.

The controller may control the display to display a poll UI which includes basic information which corresponds to a poll theme that is generated based on user preference information of the user and information related to the basic information.

The poll UI may include a first area which includes the basic information that corresponds to the poll theme, a second area that includes the relevant information, and a third area that includes another on-going poll information.

In response to the relevant information being selected on the poll UI, the controller may control the communicator to receive, from the external server which provides the selected relevant information, contents linked to the selected relevant information and provide the contents.

The user preference information may include at least one of preferred contents information, viewing time information, preferred broadcasting station information, preferred genre information, viewers' age information, and viewers' gender information.

According to an aspect of another exemplary embodiment, there is provided a server apparatus including a communicator configured to communicate with a display apparatus, a storage configured to store user preference information about contents received from the display apparatus, and a controller configured to generate feedback information about the contents based on the user preference information and control the communicator to transmit the feedback information to the display apparatus, wherein the feedback information includes at least one of a poll UI which is related to the contents and a control UI to control playback timing of the contents.

The control UI may include a time bar that is used to control a contents playback time and a GUI which is preset at a time which corresponds to at least one scene of the contents on the time bar, and in which the preset GUI may include user preference information about at least one scene of the contents.

The controller may control the communicator to transmit, to the display apparatus, feedback information including information about at least one scene which is detected based on user preference information on each scene of the contents and a number of users to enable the control UI to be provided.

In response to information on user information being received from the display apparatus, the controller may control may control the communicator to transmit, to the display apparatus, basic information which corresponds to a poll theme that is determined according to the user preference information and relevant information about the basic information to enable the poll UI to be provided.

In response to viewers' participation results on the poll being received from the display apparatus, the controller may generate a poll result by combination of the viewers' participation results and transmit the generated poll result to the display apparatus.

The controller may receive, from the external content providing apparatus, the basic information and the relevant information.

According to an aspect of another exemplary embodiment, there is provided a method for controlling a display apparatus including displaying contents on a screen, and displaying a feedback UI on the screen which is generated based on user preference information about the contents, wherein the feedback UI may include at least one of a poll UI which is related to the contents and a control UI that is used to control playback timing of the contents.

According to an aspect of another exemplary embodiment, there is provided a method for controlling a server apparatus including communicating with a display apparatus, storing, from the display apparatus, user preference information about contents received from the display apparatus, and generating feedback information about the contents based on the user preference information and transmitting the feedback information to the display apparatus, wherein the feedback information may be information to provide at least one of a poll UI which is related to the contents and a control UI to control playback timing of the contents.

According to the above-described various exemplary embodiments, various feedback UIs may be provided based on a user preference. Accordingly, a user may be provided with various contents-related services.

BRIEF DESCRIPTION OF THE DRAWINGS

The above and/or other aspects will be more apparent by describing the exemplary embodiments with reference to the accompanying drawings, in which.

DETAILED DESCRIPTION

Figure 1:
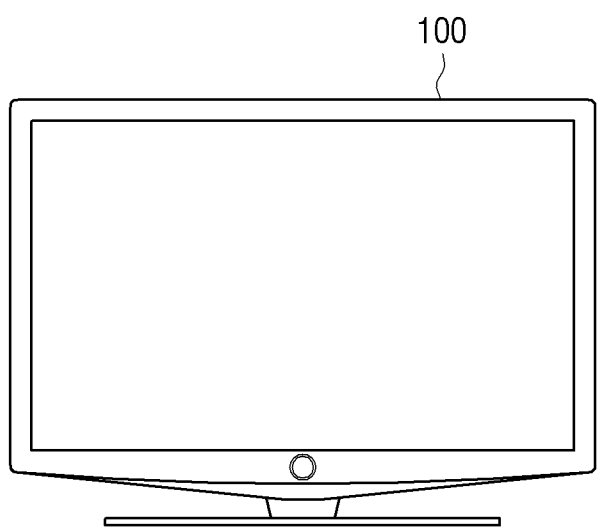
FIG. 1 is a block diagram illustrating a display system according to an exemplary embodiment.
Figure 1:
Figure 1:
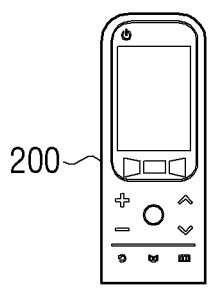

Hereinafter, exemplary embodiments of the inventive concept are described in greater detail with reference to the accompanying drawings.

In the following description, same reference numerals are used for same elements when they are depicted in different drawings. The matters defined in the description, such as detailed construction and elements, are provided to assist a comprehensive understanding of the exemplary embodiments. Thus, it is apparent that other embodiments can be carried out without the specifically defined matters. Also, functions or elements known in the related art are not described in detail because they would obscure the exemplary embodiments described herein with unnecessary detail.

FIG. 1 is a block diagram illustrating a display system according to an exemplary embodiment.

According to FIG. 1, a display system includes a display apparatus 100 and a remote controller 200.

For example, the display apparatus 100 may be a digital TV as illustrated in FIG. 1, but is not limited thereto. As another example, the display apparatus may be various types of apparatuses such as a personal computer (PC), a mobile phone, a tablet PC, a portable multimedia player (PMP), a personal digital assistant (PDA), a navigation system, an appliance, and the like. When the display apparatus 100 is a portable device, the display apparatus may be implemented to have a touch screen such that a program may be executed using fingers or a pen for example, a stylus pen. Herein below, for easier explanation, a case where the display apparatus is implemented as a digital TV is described.

When the display apparatus 100 is a digital TV, the display apparatus 100 may be controlled by user motion, vocal commands, the remote controller 200, and the like. In this example, the remote controller 200 may remotely control the display apparatus 100, and the remote controller may receive a user command and transmit a control signal which corresponds to the input user command to the display apparatus 100. For example, the remote controller 200 may be include various types such as sensing movements of the remote controller 200 and transmitting a signal which corresponds to the sensed movements, recognizing a vocal command and transmitting a signal which corresponds to the recognized vocal command, and transmitting a signal which corresponds to an input key. For example, the remote controller 200 may include a motion sensor to receive user commands in various types, a touch sensor, an optical joystick (OJ) sensor which applies optical technology, a physical button for example, Tact Switch, a display screen, a microphone, a camera, and the like.

The display apparatus 100 may provide various user interfaces (UIs) according to a user command which is input through the remote controller 200. In addition, the display apparatus 100 may provide various functions and information according to user interactions with respect to a UI screen.

For example, the user preference information may include viewing history information which will be described below, and the display apparatus 100 may provide various feedback UI screens, for example, a UI screen for a highlight image on a contents playback screen and a poll screen related to contents. Hereinbelow, with reference to a block diagram which illustrates an example of the display apparatus 100, various exemplary embodiments are described.

Figure 2A:
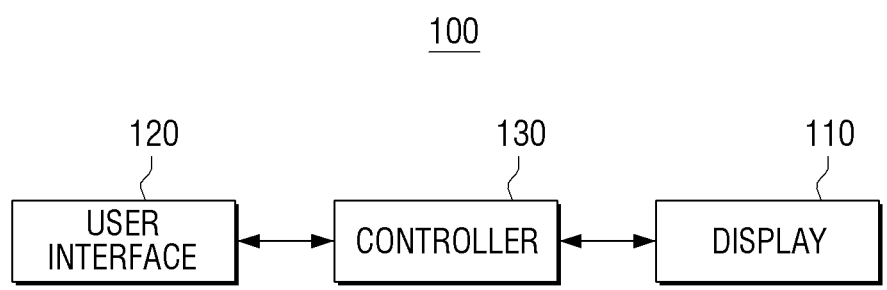
FIGS. 2A-2B are block diagrams illustrating a display apparatus according to exemplary embodiments.

FIG. 2A is a block diagram illustrating a display apparatus according to an exemplary embodiment.

According to FIG. 2A, the display apparatus 100 includes the display 110, a user interface 120, and a controller 130.

The display 110 displays various screens. For example, a screen may include various screens that playback various contents such as an image, a video, a text, and music, or an application execution screen including various contents, a web browser screen, a graphic user interface (GUI) screen, and the like.

As an example, the display 110 may be a Liquid Crystal Display (LCD) panel, Organic Light Emitting Diodes (OLED), and the like, but is not limited thereto. In addition, the display 110 may be implemented as a flexible display and a transparent display in some examples.

For example, the display 110 displays a time bar to control a contents playback screen and contents playback timing. For example, the display 110 may display a video on demand (VOD) contents playback screen.

The user interface 120 receives various user commands. For example, the user interface 120 may be various types according to implementation examples of the display apparatus 100. For example, if the display apparatus 100 is implemented as a digital TV, the user interface 110 may be implemented as a remote controller receiver which receives a remote controller signal from the remote controller 200, a camera which senses a user motion, a microphone which receives user vocal commands, and the like. In addition, when the display apparatus 100 is a touch-based portable terminal, the user interface 120 may include a touch screen type which forms a mutual layer structure with a touch pad. In this example, the user interface 120 may be used as the above-described display 110.

Further, the user interface 120 may receive user interaction for the contents playback screen which is displayed on the display 110.

For example, the user interface 120 may receive a user interaction (hereinafter, check-in interaction) which displays a preference on a scene which includes contents, and the user interaction may be not only a preset button provided on the remote controller 200 but also a preset user voice or a preset user motion. For example, a user voice that says "Like" or a user motion drawing a heart " ♡ " can be the user interaction.

The controller 130 controls the overall operations of the display apparatus 100.

For example, the controller 130 may control to display on a screen a feedback UI which is generated based on user preference of the contents and/or preference information of other users. For example, the feedback UI may include at least one of a poll UI related to the contents and a control UI to control the contents playback timing.

<Provision of a Control UI>

The controller 130, according to an exemplary embodiment, may provide a control UI which includes information on highlight image playback timing to which several users' feedbacks are included or an image playback area.

For example, the controller 130 may control to display a control UI which includes a graphical user interface (GUI), to which user preference or user interest is reflected, on timing which corresponds to at least one scene of the contents on a time bar which is provided on a contents playback screen. Here, the at least one scene may be a scene in which user preference satisfies a preset criterion.

When there is at least one scene in which a user preference satisfies a preset criterion in an image area, the controller 130 may display the GUI, to which the user preference is reflected, on a starting point of the image area, so that the image area may be distinguished from other image areas.

As an example, the user preference may be calculated based on at least one of a social networking service (SNS) sharing information on each scene of the contents and information on a check-in interaction of each scene of the contents. For example, the user preference may be calculated based on at least one of the number of users that have shared each scene of the contents via SNS and the number of users who input a check-in interaction on each scene of the contents. The SNS sharing information may be information of various types such as captured corresponding contents and uploaded to an SNS server, indicating preference on the uploaded contents scenes using a reply, a vote, or the like, real-time reply information such as Twitter, and the like. For example, when the number of Twitter replies on a specific program increases more than a preset number of times within a preset time from a broadcasting time of a specific scene of a program, this may be used for calculating user preference on the corresponding scene.

In addition, at least one scene which corresponds to a GUI displaying timing may be a scene in which a user preference satisfies a preset condition. For example, at least one scene which corresponds to a GUI displaying timing may be detected based on at least one between when a user preference is greater than a preset criterion or a user preference is increased greater than a preset ratio. For example, when at least one of the number of users that have shared each scene of the contents via SNS and the number users who input a check-in interaction for each scene of the contents is greater than a preset number of users, it may be determined that the user preference is greater than a preset criteria.

The GUI in which a user preference is reflected may include the number of empathic users that have expressed preference on at least one scene of the contents or one area. For example, the number of empathic users which indicates at least one of the number of users who share each scene of the contents via SNS and the number of users who input a check-in interaction on each scene of the contents may be included. As an example, the GUI to which the user preference is reflected may be a GUI that has a speech balloon shape, but is not limited thereto.

In addition, the controller 130 may control a playback state of the contents so that the contents jump to a display timing or a display area of a GUI to which a user preference is reflected in accordance with the user interaction. Hereinbelow, timing when jumping is available or an area where jumping is available will be referred to as jumping timing and jumping area, respectively.

For example, when a user interaction which presses and manipulates a direction key provided on the remote controller 200 is received, a playback state of the contents may be controlled by the controller 130 so that the contents may jump to a specific jumping point or a starting point of the jumping area.

For example, on the jumping point, a highlight GUI, a selection GUI, cursor GUI, and the like, may be displayed, and a user may move a location of the highlight GUI and move playback timing to another jumping point. In this case, movement from the jumping point of the highlight GUI to another jumping point may be performed by manipulation of a direction key (not illustrated) and which is provided on the remote controller 200. For example, when pressing a right direction key or an upward direction key, the highlight GUI may move to a next jumping point, and when pressing a left direction key or a downward direction key, the highlight GUI may move to the previous jumping point.

The controller 130 may calculate jumping point or jumping area by using various methods. For example, the starting point and the ending point of the area where an absolute level of the user preference is above a certain criterion may be calculated as a jumping area, or the starting point of the timing when absolute level of the user preference is above a certain criterion may be calculated as a jumping point.

When a length of the area where an absolute level of the user preference sustains for a certain criterion or more is over a certain criterion, the starting point and the ending point of the area may be calculated by the controller 130 as a jumping area. As another example, when a length of the area where the absolute level of the user preference sustains for a certain criterion or more is over a certain criterion, and when relative level of the user preference, for example, user preference before 1 minute increases for more than a certain ratio, the starting point of the area may be calculated as a jumping point.

Accordingly, a highlight image to which many users' preference are reflected or an image area may be selected and viewed by a user.

In addition, the controller 130 may provide a preference display history of a certain user. For example, the specific user may be recognized through a log-in or another user recognition skill. The controller 130 may process the preference display history of the specific user and use the processed preference display history for viewing a pattern or matters of interests, or use it for recommending new contents.

<Provision of a Poll UI>

In addition, according to another exemplary embodiment, the controller 130 may control to display a poll UI which includes basic information and information related to the basic information based on user preference information.

Here, the poll UI is a UI screen which is composed of a poll and relevant data. Accordingly, the data which is included in the poll UI indicates basic data such as images, videos, texts, and the like, regarding a specific theme which will constitute of poll, and data related to the basic data. The poll indicates a vote, indicating selection of anyone out of a plurality of candidates on a certain theme, and it indicates that a screen is composed using basic data in a format selectable by a user within a poll screen. For example, when there is a theme regarding "hottest couple out of recent TV soap operas," a relevant poll may include the couples in the soap opera that are candidates, and users of display apparatus may select one couple out of the candidate couples using a thumbnail image, a video, a text, and the like.

In addition, relevant information may be used to indicate the data which is relevant to contents of basic data and include the contents which a poll screen viewer may purchase or consume. For example, a thumbnail image which is linked to a video on demand (VOD) of the soap opera related to the candidate couples, or an advertisement screen regarding clothes or accessories that the couple is wearing may be an example.

In other words, the poll UI indicates a UI screen which is composed and includes a poll which a viewer may select based on relevant data.

For example, the poll UI may include a first area which includes basic information which corresponds to the poll theme, a second area which includes relevant information related to a basic theme, and a third area which includes other on-going poll information.

In addition, when relevant information is selected on a poll screen, the controller 130 may receive the contents which are linked to the relevant information which is selected from an external server and which provides the selected relevant information and provide the contents. For example, the user preference information may include at least one of preferred contents information, viewing time information, preferred broadcasting station information, preferred genre information, viewers' age information, viewers' gender information, and the like.

Figure 2B:
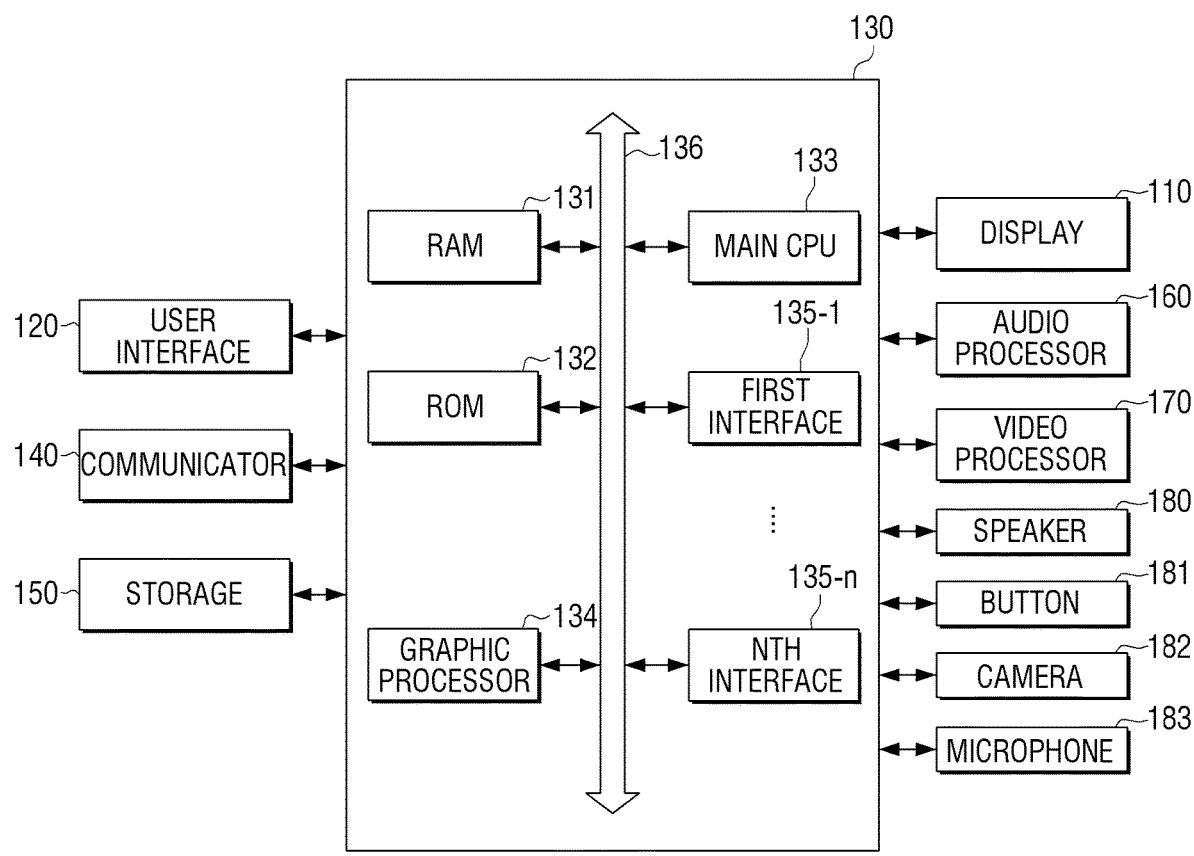

FIG. 2B is a block diagram illustrating the display apparatus 100' according to an exemplary embodiment. According to FIG. 2B, display apparatus 100' includes the display 110, the user interface 120, the controller 130, the communicator 140, the storage 150, an audio processor 160, a video processor 170, a speaker 180, a button 181, a camera 182, and a microphone 183. From among the elements illustrated in FIG. 2B, the elements which are overlapped with the elements in FIG. 2A will not be further detailed.

The communicator 140 communicates with an external apparatus according to various types of communication methods.

For example, the communicator 140 may perform communication with various servers including an SNS and a contents providing server. Here, the communicator 140 may include various communication chips such as Wi-Fi chip, Bluetooth chip, wireless communication chip, near field communication (NFC) chip, and the like.

According to an exemplary embodiment, the communicator 140 may receive information on a contents scene which satisfies a preset condition from an external server.

For example, the communicator 140 may receive information of at least one of a contents scene in which the user preference is greater than a preset criterion and a contents scene in which the user preference increases by more than a preset ratio.

For example, the communicator 140 may receive information on the content scene which the users (which are greater than a preset number) share via SNS, from the SNS server or a server for management of SNS-related information. In addition, the communicator 140 may receive information on the contents scene that has a preset number of users input check-in interactions from a server which manages check-in interaction information of other users.

As another example, the communicator 140 may receive information from a server which manages the SNS and information related to SNS information on the scene of contents in which the SNS sharing number drastically increased. In addition, the communicator 140 may receive from the server, which manages check-in interaction information, the information on the scene of the contents in which the check-in interaction input number of a user drastically increased.

In addition, the communicator 140 according to another exemplary embodiment may receive, from an external server, basic information which corresponds to the poll theme which is generated based on user preference information and information relevant to basic information.

Further, when relevant data is selected on the poll screen, the communicator 140 may receive the contents which are linked to the relevant data which is selected from an external server which provided the selected relevant data.

The storage 150 stores various data such as an operating system (0/S) software module that is used to drive the display apparatus 100, various multimedia contents, various applications, various contents which are input or set while executing the applications, and the like. For example, the storage 150 may store information related to various user preferences that are received through the communicator 140, for example, the contents scene which satisfy a preset condition.

In addition, when the check-in interaction on the contents scene is input, the storage 150 may store the corresponding information.

Meanwhile, the controller 130 may control the overall operations of the display apparatus 100 using the various programs stored in the storage 150.

For example, the controller 130 includes RAM 131, ROM 132, main CPU 133, graphic processor 134, the $1^{st}$ to $n^{th}$ interface 135-1~135-n, and bus 136.

The RAM 131, ROM 132, the main CPU 133, the graphic processor 134, the $1^{st}$ to $n^{th}$ interface 135-1~135-n may be interconnected through the bus 136.

The $1^{st}$ to $n^{th}$ interface 135-1~135-n are connected to the above-described elements. For example, one of the interfaces may be network interfaces which are connected to an external apparatus through a network.

The main CPU 133, by accessing the storage 150, performs booting using the O/S stored in the storage 150. In addition, the main CPU performs various operations using various programs, contents, and that are data stored in the storage 150.

In the ROM 132, a command set for system booting is stored. When power is supplied such as when a turn-on command is input, the main CPU 133, according to a command stored in the ROM 132, copies the O/S stored in the storage 150 to the RAM 131, and executes the O/S to boot the system. When booting is completed, the main CPU 133 copies various application programs stored in the storage 150 to the RAM 131, executes the application program copied to the RAM 131, and performs various operations.

The graphic processor 134, using a calculator (not illustrated) and a renderer (not illustrated), generates a screen which includes various objects such as icons, images, texts, and the like. For example, based on a received control command the calculator calculates attribute values such as coordinate value, formats, size, and color according to layout of a screen. The renderer generates a screen of various layouts including objects based on the attribute value calculated by the calculator. The screen which is generated in the renderer is displayed within a display area of the display 110.

The audio processor 160 performs processing of the audio data. The audio processor 160 may perform various processing such as decoding, amplification, noise filtering of audio data. For example, when there is a check-in interaction, or an interaction to select a badge item, the audio processor 160 may generate and provide feedback sound which corresponds to the interaction.

The video processor 170 performs processing of video data. For example, the video processor 170 may perform various image processing such as decoding, scaling, noise filtering, frame rate conversion, and resolution conversion of the video data.

The speaker 180 may output various alarm sounds or a voice message in addition to various audio data processed by the audio processor 160.

The button 181 may have various types such as a mechanical button which is formed on random areas such as a front side, side, or a backside of the outside of the display apparatus 100, a touch pad, a wheel, and the like. For example, a button to turn on/off the display apparatus 100' may be provided.

The camera 182 has the configurations to photograph a still image or a video according to a user control. For example, the camera 182 may photograph various user motions to control the display apparatus 100'.

The microphone 183 may receive a user voice command or other sound to control the display apparatus 100' and convert them to audio data. The controller 130 may convert the user voice which is input through the microphone 183 into audio data and use it for controlling the display apparatus 100. The camera 182 and the microphone 183 may be a part of the configuration of the user interface 120 according to functions.

When the camera 182 and the microphone 183 are provided, the controller 130 may perform control operations according to a user vocal command which is input through the microphone 183 and/or a user motion which is recognized through the camera 182. That is, the display apparatus 100' may be operated with a motion control mode and/or a voice control mode. In case of the motion control mode, the controller 130 may activate the camera 182, photograph a user, track changes in a user motion, and perform corresponding control operations. In case of the voice control mode, the controller 130 may analyze a user speech which is input through the microphone and may be operated with the speech recognition mode which performs control operations according to the analyzed user speech.

In addition, various external input ports may be further included to connect with various external terminals such as, for example, a headset, a mouse, a LAN, and the like.

FIG. 2B illustrates the display apparatus 100' according to another exemplary embodiment. It should be appreciated that a part of the elements illustrated in FIG. 2B may be omitted or changed, and other elements may be further added. Though not illustrated in the drawings, the server (not illustrated) may calculate user preference on the contents scene based on various information.

Figure 3A:
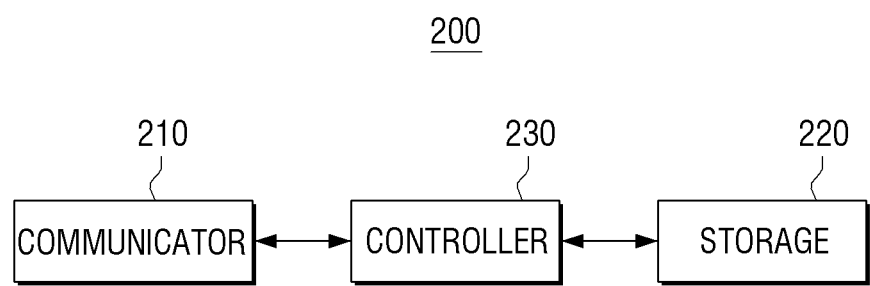
FIGS. 3A to 3C are illustrating a server according to exemplary embodiments.

FIG. 3A is a block diagram illustrating a server according to an exemplary embodiment.

According to FIG. 3A, a server apparatus 200 includes a communicator 210, a storage 220, and a controller 230.

The communicator 210 communicates with the display apparatus, a content providing apparatus, and the like.

The storage 220 stores user preference information on the contents received from the display apparatus.

The controller 230 generates feedback information on the contents based on user preference information and transmits the information to the display apparatus. For example, the feedback information may be information used to provide at least one of the poll UI and the control UI from the display apparatus 100.

For example, the controller 230 may transmit, to the display apparatus 100, feedback information including information about at least one scene which is detected based on user preference information on each scene of the contents and the number of empathic users.

Further, when user preference information is received from the display apparatus 100, the controller 230 may control the poll UI by transmitting to the display apparatus 100 basic information, which corresponds to the poll theme that is determined according to user preference information, and relevant information.

In addition, when the viewer participation results on the poll are received from the display apparatus 100, the controller 230 may generate the poll results by integrating the viewers' participation results and may transmit the generated poll results to the display apparatus. In this example, the controller 230 may receive, from the external contents providing apparatus, basic information and relevant information.

Figure 3B:
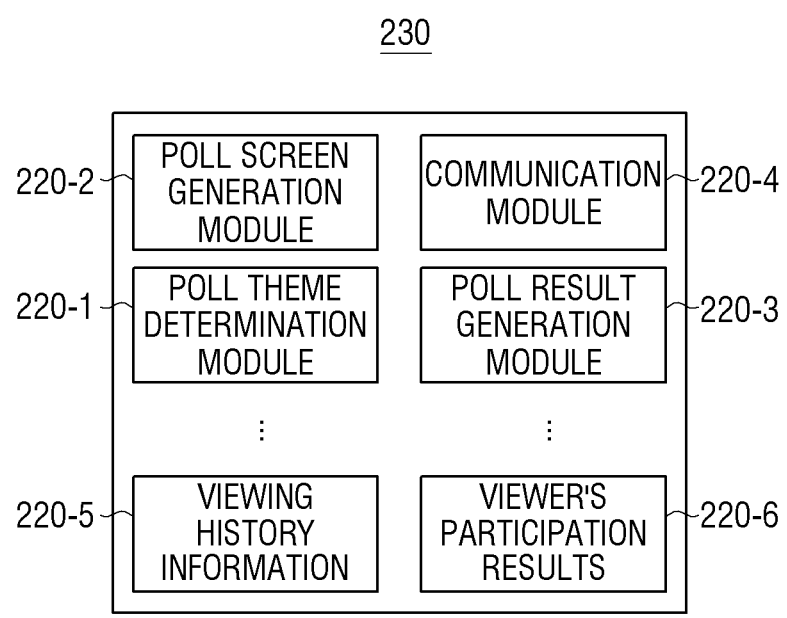

The storage 220 may include various modules as illustrated in FIG. 3B that may be used to provide feedback information for the poll UI, according to another exemplary embodiment.

Figure 3C:
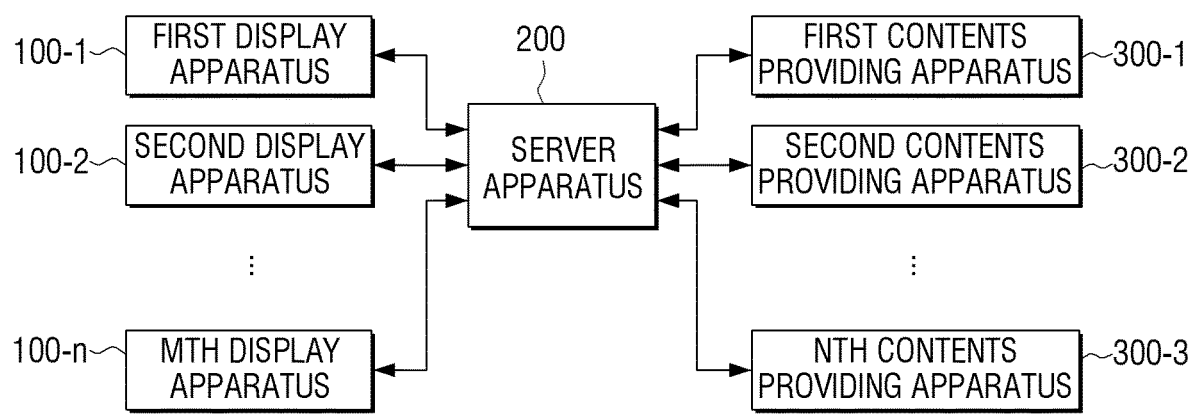

According to FIG. 3C, the storage 220 may include, for example, a poll theme determination module 220-1, a poll screen generation module 220-2, a poll results generation module 220-3, and a communication module 220-4. In addition, the storage 220 may store the viewing history information 220-5 received from the display apparatus or viewers' participation results 220-6.

The communication module 220-4 is a program in which the server device 200 communicates with an external apparatus through the communicator 210. There is no limitation in terms of the communication between the server device 200 and an external apparatus. Therefore, according to the communication method between the server device 200 and an external apparatus, a suitable communication module 220-4 may be provided on the storage 220.

The viewing history information 220-5 indicates information about a user's display apparatus viewing history and may include at least one of information on preferred contents, viewing time information, preferred broadcasting information, preferred genre information, viewers' age information, viewers' gender information, and the like.

For example, when a display apparatus is a TV or other display device, preferred contents information may be a broadcasting program which a viewer prefers, viewing time information may be a time when a viewer mainly views TV, preferred genre For example may be information on which genre a viewer prefers out of entertainment, soap opera, documentary, and the like.

The poll theme determination module 220-1 is a program to determine a poll theme based on viewing history information of a user of the display apparatus.

For example, the poll theme may be determined based on viewing history information, and may be used to indicate what basic data the poll screen is related to.

The poll theme determination module 220-1 refers to one to one matching between viewing history information with the poll theme which corresponds to a combination of the viewing history information, in order to determine the poll theme based on viewing history information.

For example, viewing history information may be received where viewing gender information is "female," viewers' age information is "25," and preferred genre information is "soap opera." In this example, the poll theme determination module may determine "the most handsome male hero in a soap opera" which corresponded to the information of "female & 20's & soap opera."

As another example, when the preferred contents information is received as the TV entertainment program "Endless Challenge", the poll theme determination module may be determined as the "latest most interesting entertainment program" which corresponded to the program "Endless Challenge."

However, one or more exemplary embodiments are not limited thereto, and the poll theme determination module may be implemented as various algorithms to determine a theme according to a relevance with input information.

The poll screen generation module 220-2 refers to a program to generate a poll screen.

The poll screen generation module 220-2 may generate a poll using basic data such as an image, a video, and text which correspond to the poll theme, and generate a poll screen by composing the data which includes relevant data, that is, the data related to basic data and the data which includes contents that a viewer may purchase or consume, in one screen along with the generated poll data.

The viewer participation result 220-6 indicates results of a viewer's participation in a poll through a poll screen which is provided to the display apparatus 100. For example, it may refer to result information on a viewer's selection of a preference on a poll in a poll screen.

The poll results generation module 220-3 is a program to generate a poll result by combining viewer's participation results. Here, the poll results may indicate the entire results on the poll theme which is drawn by integrating the viewers' participation results.

The poll results generation module 220-3 may integrate the entire results of the viewer's participation on one poll and generate the poll results, to generate the poll results.

For example, the poll results generation module 220-3 may determine the most voted on candidate as the top candidate by calculating the number of selected poll candidates on the poll screen, that is the viewer's participation results 220-6 stored in the storage 220, and may determine the least voted candidate as the bottom candidate, and generate the poll results by listing the top to bottom candidates.

However, the poll results generation method is not limited thereto, and may be generated with various algorithms. As another example the poll results may determine the top and the bottom candidates only.

In this example, the controller 230, when viewing history information that is received from the display apparatus 100 through the communicator 210, may determine the poll theme based on the received viewing history information.

The controller 230 may use the poll theme determination module 220-1. In this example, the poll theme may be automatically determined according to a viewer's history information.

The poll theme may be determined whenever the viewing history information is received from the display apparatus 100, but also may be received for a preset time and determined by a combination of the viewing history information which is stored in the storage 220.

The controller 230 may determine the poll theme by a user input of the user of the server device 200. In this example, the server device 200 may input the theme by inputting the poll theme directly to the server device 200 or selecting any one of the poll themes which are prestored in the poll theme determination module 220-1, and the controller 230 may determine the theme which is input by a user as the poll theme.

Accordingly, when the poll theme is determined, the controller 230 may control the communicator 220 such that the basic data which corresponds to the determined poll theme is requested to the at least one contents providing apparatus (FIG. 3) 300-1 to 300-*n*.

When the basic data which corresponds to the poll theme and information related to the basic data are received from the contents providing apparatus 300-1 to 300-*n* through the communicator 220, the controller 230 may generate the poll using basic data and constitute a poll screen which includes the poll and relevant data.

The controller 230 may use the poll screen generation module 220-2, and store the generated poll screen in the storage 220.

The controller 230 may control the communicator 210 to transmit the poll screen to the display apparatus 100.

For example, when the first event in which an icon is selected by a viewer to display a poll screen on the display apparatus 100 occurs, and the selection information is received through the communicator 210, the controller 230 may control the communicator 210 to transmit the poll screen, which is generated and stored in the storage 220, to the display apparatus.

When the second event in which a transmission command is input by a user of the server device 200 to provide a poll screen occurs, or the fourth event, in which a preset cycle nears the server device 200 program occurs, the controller 230 may control the communicator 210 to transmit the poll screen to the display apparatus.

In addition, when the third event in which a new poll is generated by change of the viewing history information of a user of the display apparatus occurs, the controller 230 may control the communicator 210 to transmit the generated poll screen to the display apparatus.

When a specific poll theme is determined first and a poll screen is generated accordingly, and the same poll theme may be determined by another display apparatus before the participation period of the poll screen elapses, and the controller 230 may not request basic data to the contents providing apparatus 300-1 to 300-*n*, and instead may transmit the poll screen which is stored in the storage 220 to the other display apparatus.

After the participation period of the poll screen elapses, even if the same poll theme is determined, basic data may be requested to the contents providing apparatus 300-1 to 300-*n* to constitute a new poll screen.

When the viewer's participation results on the poll in the poll screen transmitted to the display apparatus 100 being received through the communicator 210, the controller 230 may store the received viewer's participation results in the storage 220.

Accordingly, the controller 230 may control the communicator 210 to generate the poll results by integrating the entire viewer's participation results which are stored in the storage 220 and transmit the generated poll results to the contents providing apparatus 300-1 to 300-*n* and the display apparatus 100, respectively.

For example, there may be a viewer's participation period regarding the poll theme, and in the period, the same poll screen may be provided to each of the display apparatuses 100-1 to 100-*m* for the same theme, and thus, the poll participation results regarding which viewers of different display apparatuses that participate in the poll through the same poll screen may be transmitted to each of the server device 200 during the participation period and be stored in the storage 220.

Then, the controller 230 may generate the poll results by integrating all of the viewers' participation results on the same poll theme which is stored in the storage 220. To do this, for example, the controller 230 may use the poll results generation module 220-3.

When the poll results are generated, the controller 230 may control the communicator 210 to transmit the poll results to each of the display apparatus 100-1 to 100-*m* and the contents providing apparatus 300-1 to 300-*n*.

In this case, whenever there is a request for a poll screen display from the display apparatuses 100-1 to 100-*m*, the controller 230 may integrate the viewer's participation results which have been stored until then and transmit the results, or after the viewers' participation period for the poll elapses, the controller 230 may integrate the viewer's participation results stored in the storage 220 and transmit the poll results.

When relevant information is selected on the poll screen, the controller 230 may request data of the relevant information to the contents providing apparatus, and provide the contents which are linked to the selected data to the display apparatus.

For example, when the viewer of the poll screen which is provided to the display apparatus 100 selects relevant data on the poll screen and the selection information is received through the communicator 210, the controller 230 may request that the contents providing apparatus provide the contents which are linked to the relevant data to the display apparatus.

For example, when the relevant data is "a thumbnail image to which a soap opera VOD is linked," and if the thumbnail image is selected on the poll screen and the information is received through the communicator 210, the controller 230 may request the relevant data to the contents providing apparatus to provide the soap opera VOD to the display apparatus.

According to one or more exemplary embodiments of the poll providing server device 200, a user of the display apparatus may receive a poll regarding a user's interested theme, know other users' thoughts through the poll results, and a contents provider may increase contents purchasing opportunities through efficient provision of the poll.

For example, in order to provide the poll UI according to another exemplary embodiment, the system which is illustrated in FIG. 3C may be configured.

According to FIG. 3C, the poll providing system 1000 includes a plurality of display apparatuses 100-1~100-*m*, the server device 200, and a plurality of contents providing apparatuses 300-1~300-*n*.

Referring back to FIG. 3A, for easier explanation, it is illustrated that a plurality of display apparatuses are classified into the 1$^{st}$ to m$^{th}$ display apparatus 100-1~100-*m*, and a plurality of contents providing apparatuses are classified to the 1$^{st}$ to the n$^{th}$ contents providing apparatuses 300-1~300-*n*, and include one system with the server device 200, but each contents providing apparatus and each display providing apparatus may be independent apparatuses which may be used without correlation with each other. Further, the apparatuses 300-1~300-*n* may be made separate from the server device 200 and build one system 1000 through communication with the server device 200 later.

The contents providing apparatuses 300-1~300-*n* may provide data which constitutes a poll screen to the service device 200 upon request by the server device 200. For example, the contents providing apparatuses 300-1 to 300-*n* may provide the data, which corresponds to the poll theme which the server device 200 requests, to the server device 200.

In this example, the contents providing apparatuses 300-1~300-n may include a server device which a contents provider operates, but is not limited thereto. For example, the device may be a server device which is operated by operators who have a separate contract with contents manufacturers or a general web server device, and the like.

The display apparatuses 100-1 to 100-m may receive a poll screen from the server device 200 and display the screen, and transmit to the server device 200 viewing history information of a user of the display apparatus 100-1 to 100-m and information related to the poll screen.

In some examples, the display apparatus 100-1 to 100-m may communicate with an external apparatus, and may include a screen to display information which is received from the external apparatus. For example, one or more of the display apparatuses 100-1 to 100-m may be the display apparatus which may communicate with various types of external apparatuses such as a cable TV, an IPTV, a smart TV, a mobile phone, a tablet PC, a PC, a laptop PC, an electronic frame, a kiosk, an MP3 player, a PDA, an appliance, and the like.

The server device 200 may be connected with the display apparatuses 100-1 to 100-m and the contents providing apparatus 300-1 to 300-n, send/receive various information and data, and generate the poll screen.

For example, the server device 200 may receive, from the display apparatuses 100-1 to 100-m, the viewing history information and determine the poll theme, and request to the contents providing apparatuses 300-1 to 300-n a poll screen regarding the determined poll theme.

The server device 200 may generate a poll screen using data that is received from the contents providing apparatuses 300-1 to 300-n, provide the generated poll screen to the display apparatuses 100-1 to 100-m, and receive and store the viewers' participation results regarding the provided poll.

As an example, the server device 200 may be a server device which is operated by a manufacturer or a seller of the display apparatuses 100-1 to 100-m, but is not limited thereto. As another example, the server device may be a server device which is operated by an operator which has a separate contract, or various service devices such as an ordinary web server device.

The communication method between the contents providing apparatuses 300-1 to 300-n and the server device 100, and between the server device and display apparatuses 100-1 to 100-m indicates a method of merely sending or receiving information or data between the respective apparatuses, and is not limited thereto. For example, the communication method may be a communication method using an internet network but is not limited thereto.

<Providing the Control UI>

FIGS. 4A-8 are diagrams illustrating a method for providing a control UI according to exemplary embodiments.

FIG. 4A illustrates a method for calculating user preference on the contents scene according to an exemplary embodiment.

As illustrated in FIG. 4A, the user preference on the contents scene may be calculated based on at least one of SNS scene sharing information, check-in interaction information on the contents scene, and Twitter traffic information for contents broadcasting. In this case, different weights may be assigned to each information.

For example, as illustrated in FIG. 4A and based on the corresponding information, a social graph in which a timeline of the contents is an X axis and the user preference is a Y axis may be generated, and the points 401-403 which indicate that the social preference of the social graph satisfies a certain condition may be calculated.

Thereafter, the calculated points 401 to 403 may be recorded as the jumping points 401-1 to 401-3 on the timeline of the contents.

From among the above-described configurations, at least one of the configurations of calculating a user preference on the contents scene, generating a social graph, and calculating a point may be performed by the display apparatus 100 or an external server. For example, when the external server calculates a user preference on the contents scene and generates a social graph, calculates a point and transmits the corresponding information to the display apparatus 100, the display apparatus 100 may record the jumping point on the timeline based on the received information. As another example, the display apparatus 100 may receive, from the external server, the contents in which the jumping point is recorded on the timeline.

Figure 4B:
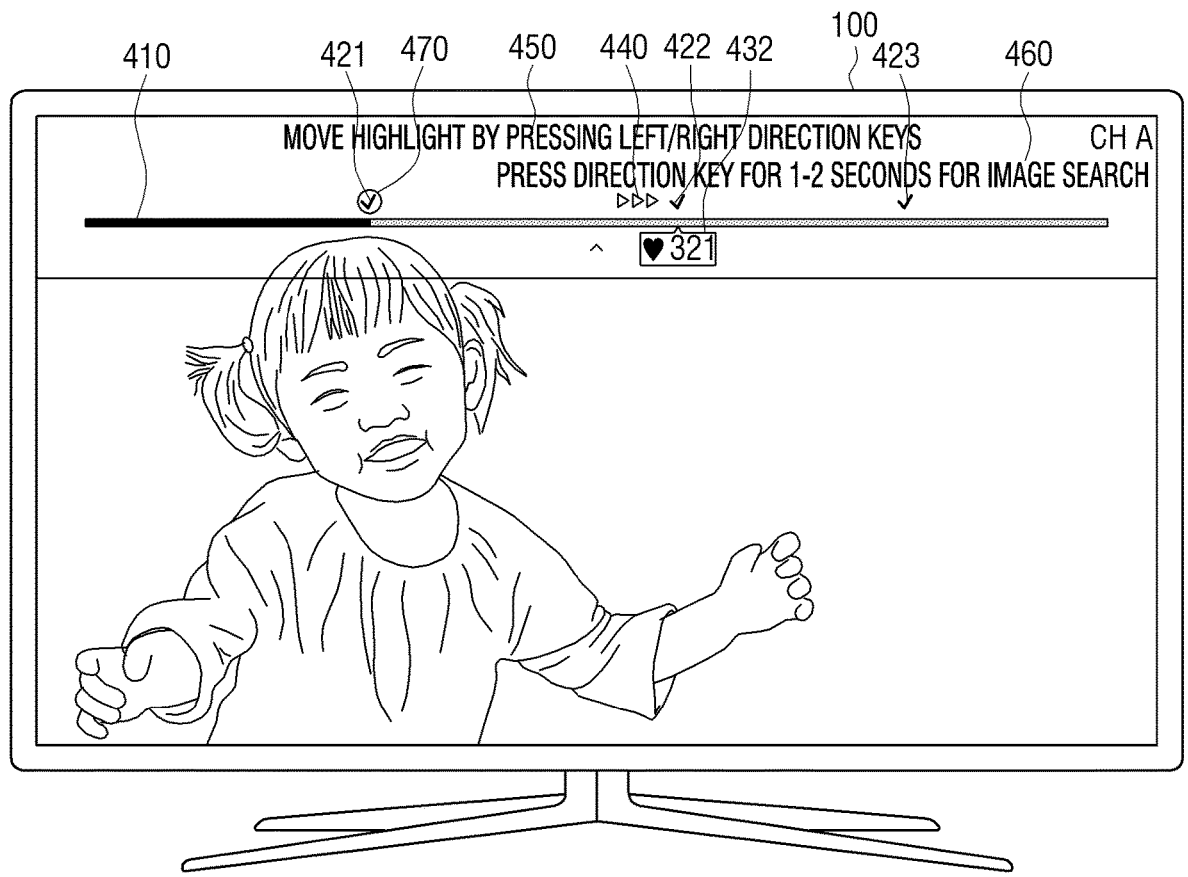
FIGS. 4A-8 are diagrams illustrating a method for providing a control UI according to exemplary embodiments.
Figure 4B:
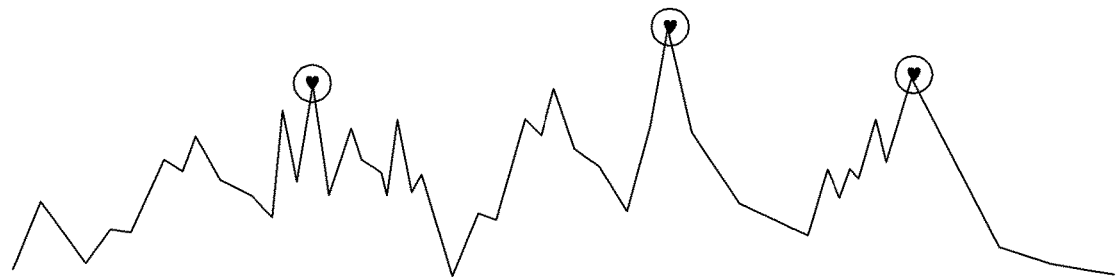

FIG. 4B is a diagram illustrating a method for providing a control UI according to an exemplary embodiment.

Referring to the method illustrated in FIG. 4A, when a jumping point in the contents is calculated, a UI screen which corresponds to the calculated jumping point is provided on the contents playback screen.

For example, on a contents playback screen, a progress bar which indicates a playback area, that is, a viewing area, may be displayed on the time bar 410 and may be used to control the contents playback timing, and GUIs 421, 422, and 423 used to identify a location which corresponds to the location of the calculated jumping point illustrated in FIG. 3 may be displayed.

In addition, out of a plurality of jumping points 421, 422, and 423, GUI 432 which indicates a degree of a user preference at one of the point locations may be displayed. For example, the degree of the user preference may be indicated numerically, but is not limited thereto. In addition, the GUI 432 which indicates the degree of the user preference may be a form of a speech balloon which includes the degree of the user preference, but is not limited thereto. In some examples, in the GUI in the speech balloon shape, a playback time at the corresponding timing instead of the degree of user preference may be displayed.

In addition, in the contents playback screen, the GUI 440 which indicates that the jumping of playback timing is available, and various guides such as GUI 450 and 460 may be displayed.

For example, when the contents are played until a specific point 421 on the time bar 410, a GUI 321 which numerically indicates a user preference on the jumping point 422 thereafter may be provided. The number may indicate the number of users that have indicated a preference of the corresponding scene. As another example, it may be a relative number which is calculated with weight based on a preset condition.

In addition, an animation GUI 440 which indicates that there is an area at the current playback timing where jumping is available ahead of the next jumping point that may be displayed. For example, the animation GUI 440 may provide animation in a state where successive arrows are in progress.

On the jumping point 421, highlight GUI 470 may be disposed, and the highlight GUI 470 may be movable by manipulation of a direction key provided on the remote controller 200. In this example, a guide GUI 450 which guides the contents may be provided on an area of the screen.

In addition, a GUI 460 to guide an image search method may be provided on another area of a screen. For example, when a left direction key is pressed such as for 1-2 seconds, the scene may rapidly move to the previous scene at a rate that is 2 times faster, and when pressing of the key is released, the scene may be stopped. In this case, the progress bar on the time bar 410 may move together. In addition, when a right direction key is pressed for 1-2 seconds, the scene may rapidly move to the next scene, and when the pressing of the key is released, the scene may be stopped. In this case, the progress bar on the time bar 410 may move together.

Figure 5A:
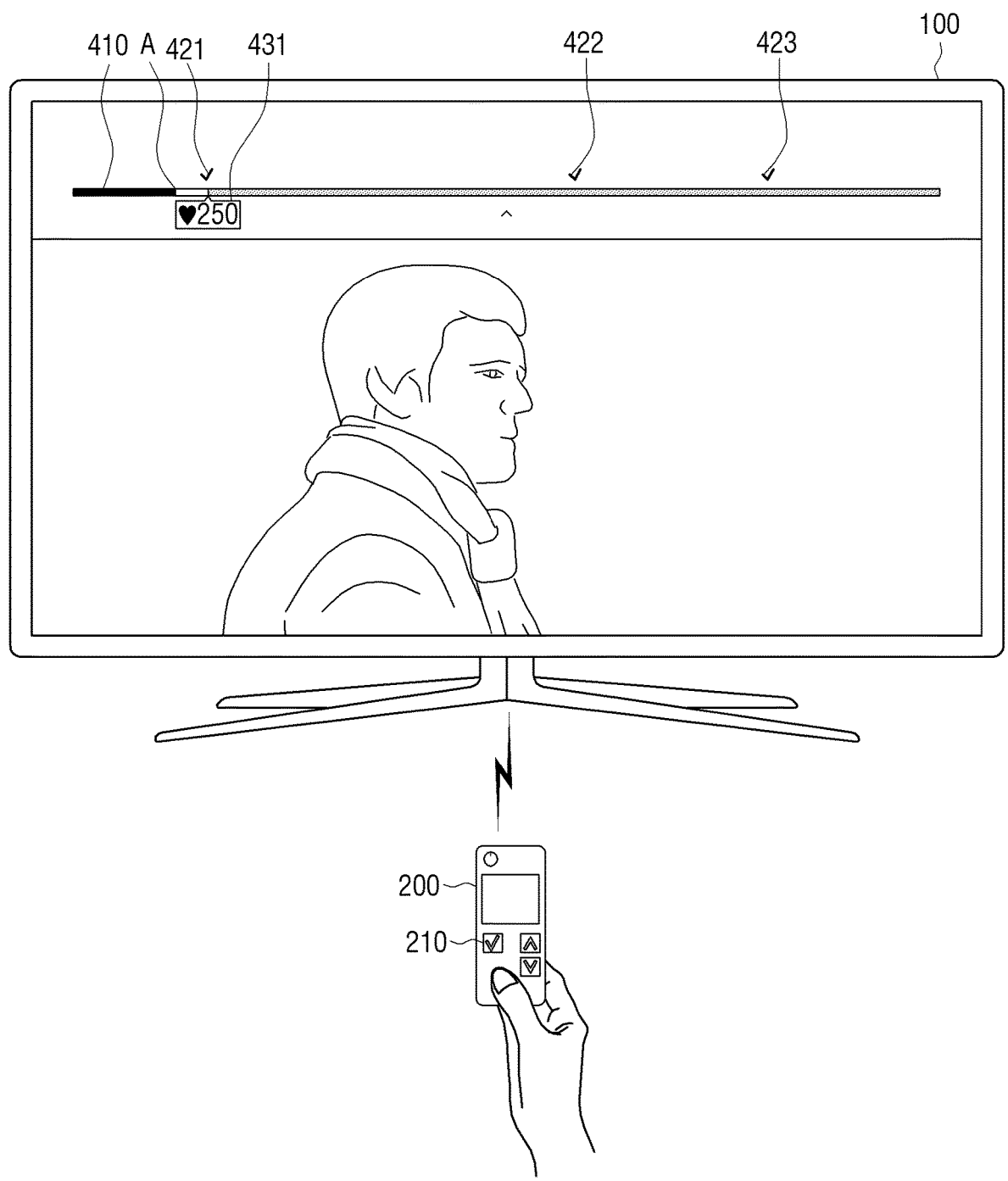
Figure 5B:
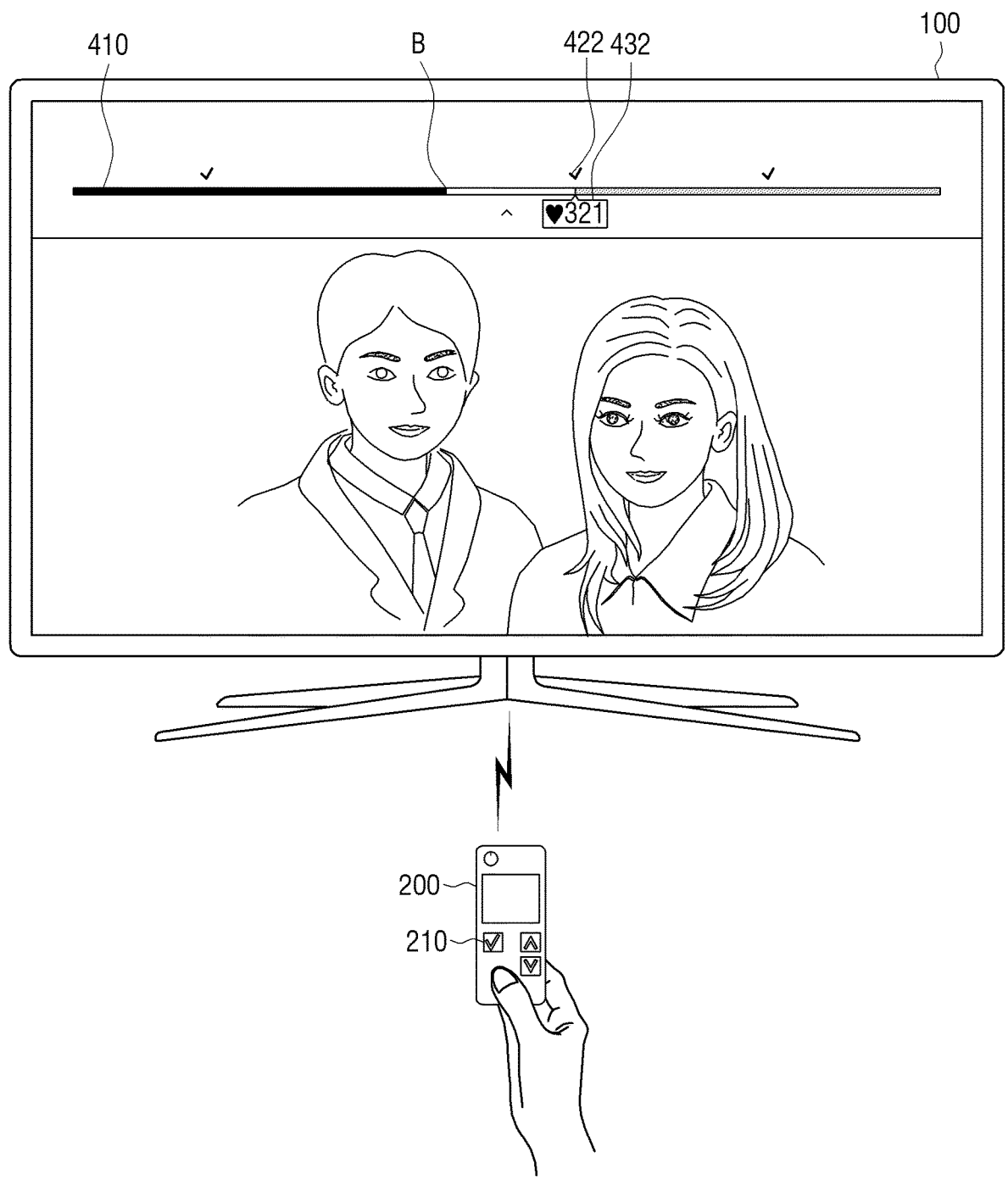

FIGS. 5A-5B are diagrams illustrating a method for providing a control UI according to an exemplary embodiment.

As illustrated in FIG. 5A, when the contents are played until timing A on the time bar 410. Here, a GUI 431 indicates user preference information on the next jumping point 421 of the current playback timing, from among three jumping points 421, 422, and 423. In this example, in the remaining jumping points 422, 423, only GUI 422 and 423 that are used to identify the corresponding location may be displayed. In this example, the area between the current playback timing A and the area of the next jumping point 421 may be indicated using a different color so that a user may easily recognize the jumping point, but the exemplary embodiment is not limited thereto.

As illustrated in FIG. 5B, when the contents are played until timing B on the time bar 410, a GUI 432 which indicates a user preference on the next jumping point 422 of the current playback timing may be provided, from among three jumping points 421, 422, and 423.

Figure 6A:
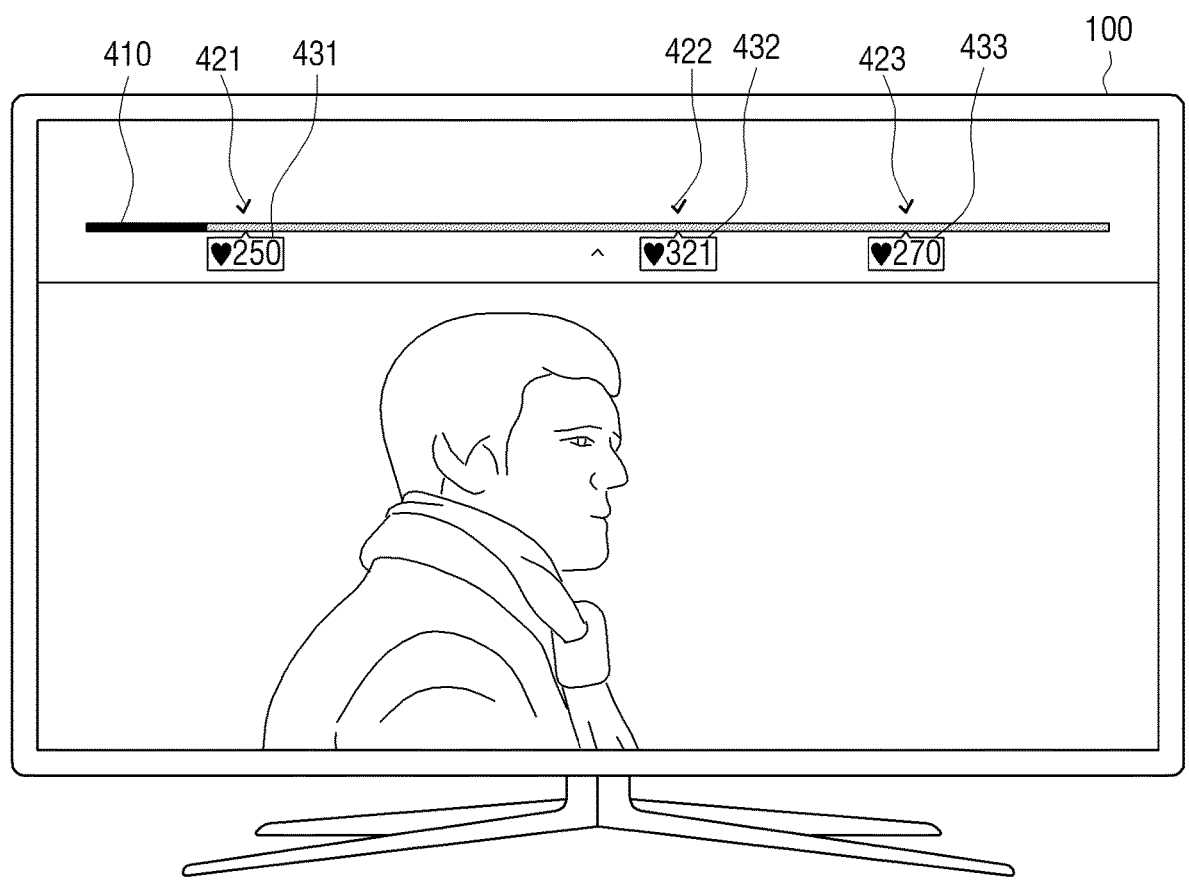
Figure 6B:
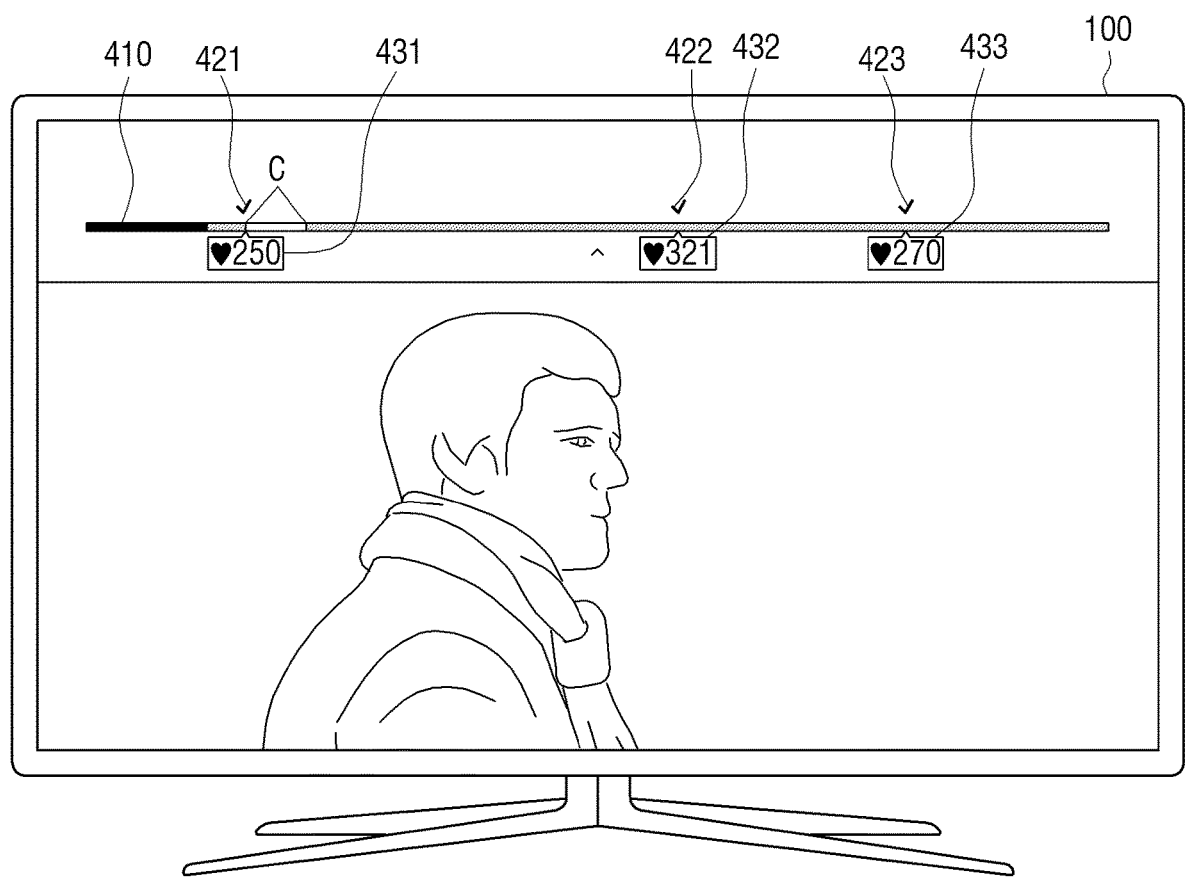

FIGS. 6A-6B are diagrams illustrating a method for providing a control UI according to another exemplary embodiment.

As illustrated in FIG. 6A, regardless of a contents playback area, that is, a current playback timing, GUI 421, 422, and 423 that are used to identify corresponding locations of jumping points 421, 422, and 423 on the time bar 410 and all of the GUIs 431, 432, and 433 which indicate user preference information may be provided.

As illustrated in FIG. 6B, according to a another exemplary embodiment, when there is jumping area C in which a user preference satisfies a preset condition, a GUI 421 to identify the corresponding location may be displayed at the starting point of the area C so that the jumping area C may be identified with other areas.

Figure 7A:
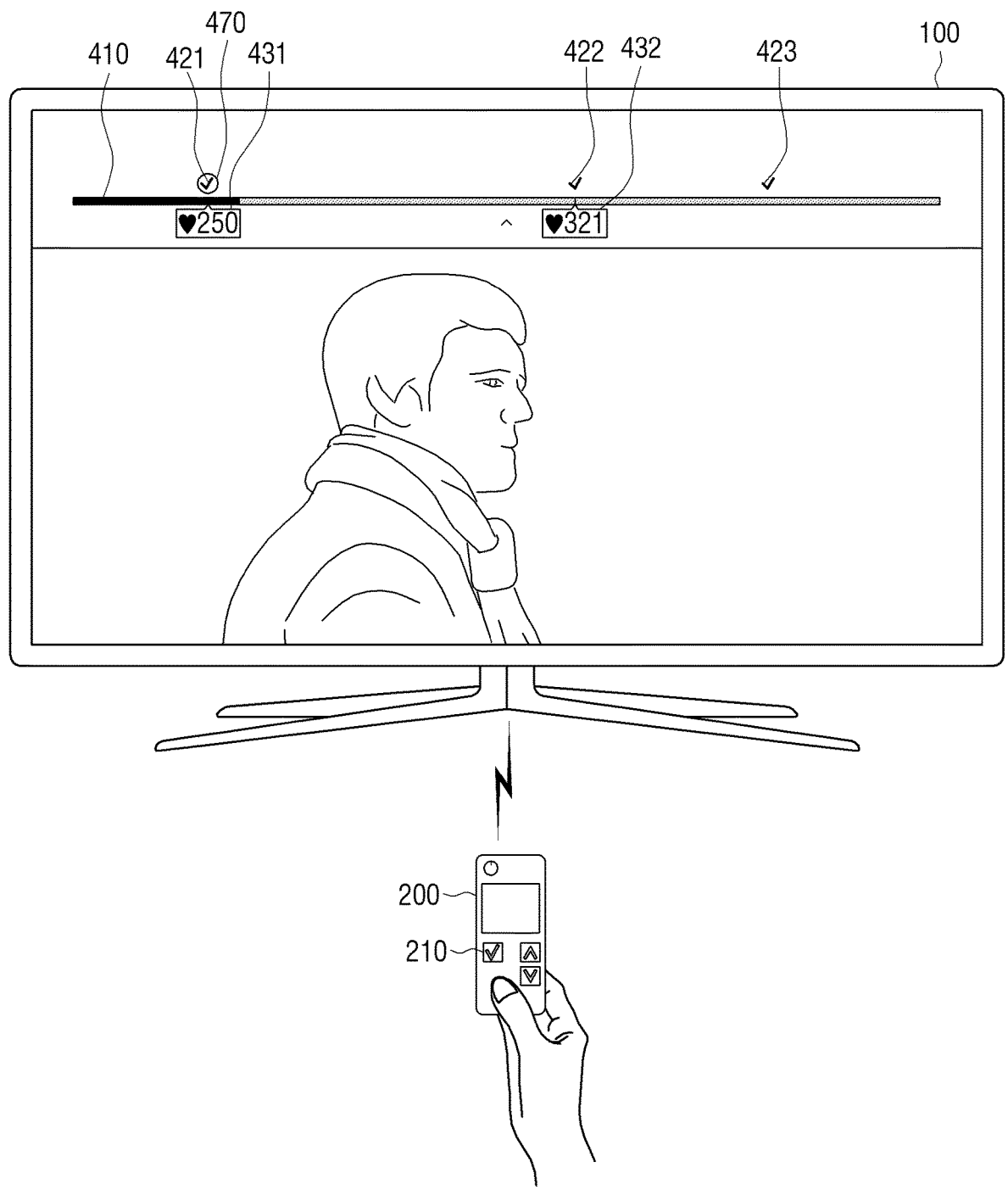
Figure 7B:
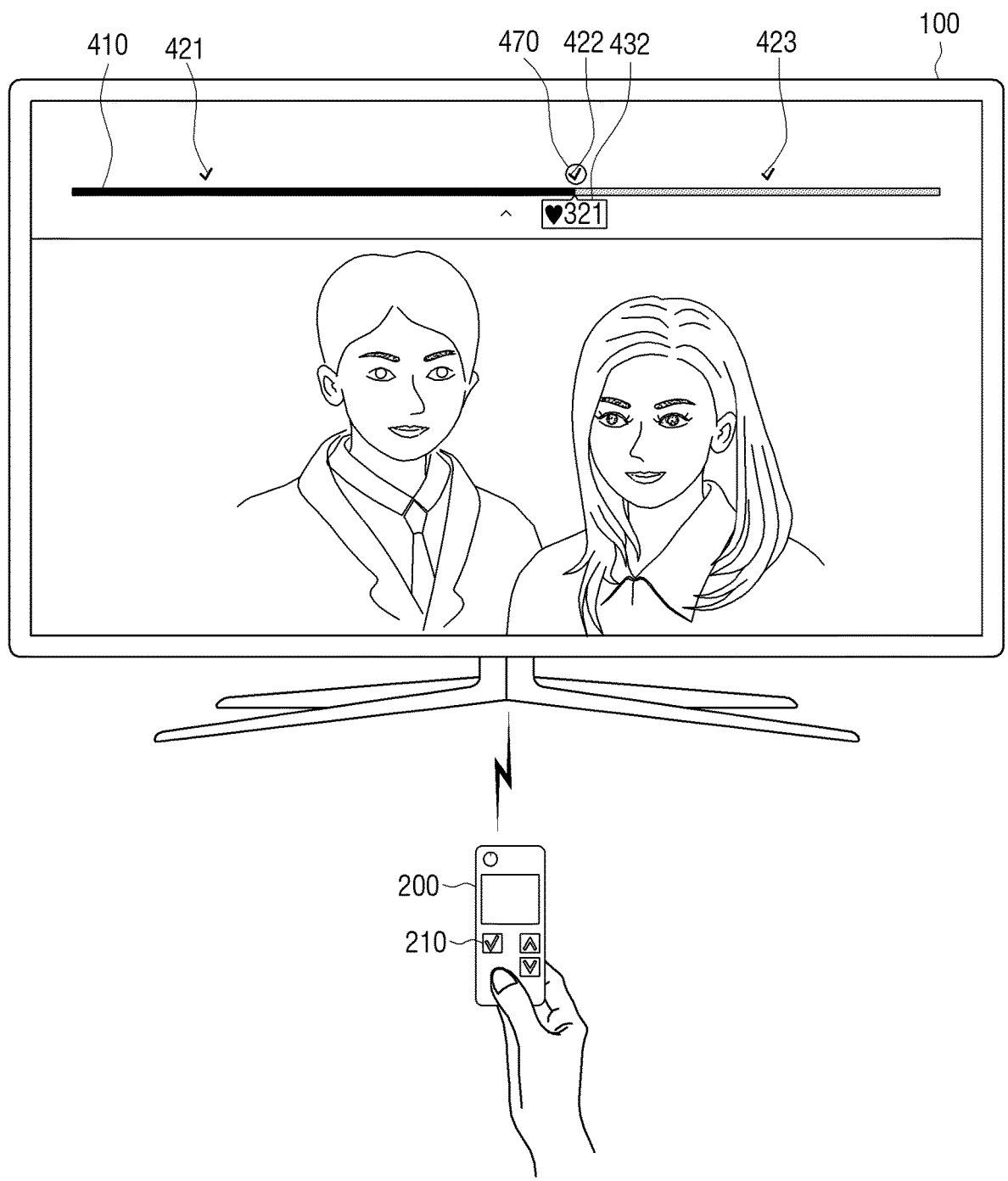

FIGS. 7A and 7B are diagrams illustrating a method for playback timing jumping according to an exemplary embodiment.

As illustrated in FIG. 7A, when a highlight GUI 470, which is located on the jumping point 421, is moved to another jumping point 422 according to a user command, contents playback timing may also move to the corresponding jumping point 422. Accordingly, as illustrated in FIG. 7B, the progress bar on the time bar 410 may move to the corresponding jumping point 422.

In this example, movement of the highlight GUI 470 from the jumping point 421 to another jumping point 422 may be performed by operation of a direction key (not illustrated) which is provided on the remote controller 200. For example, when a right direction key or an upward direction key are pressed, the highlight GUI 470 may move to the next jumping point, and when a left direction key or a downward direction key are pressed, the highlight GUI 470 may move to the previous jumping point.

Figure 8:
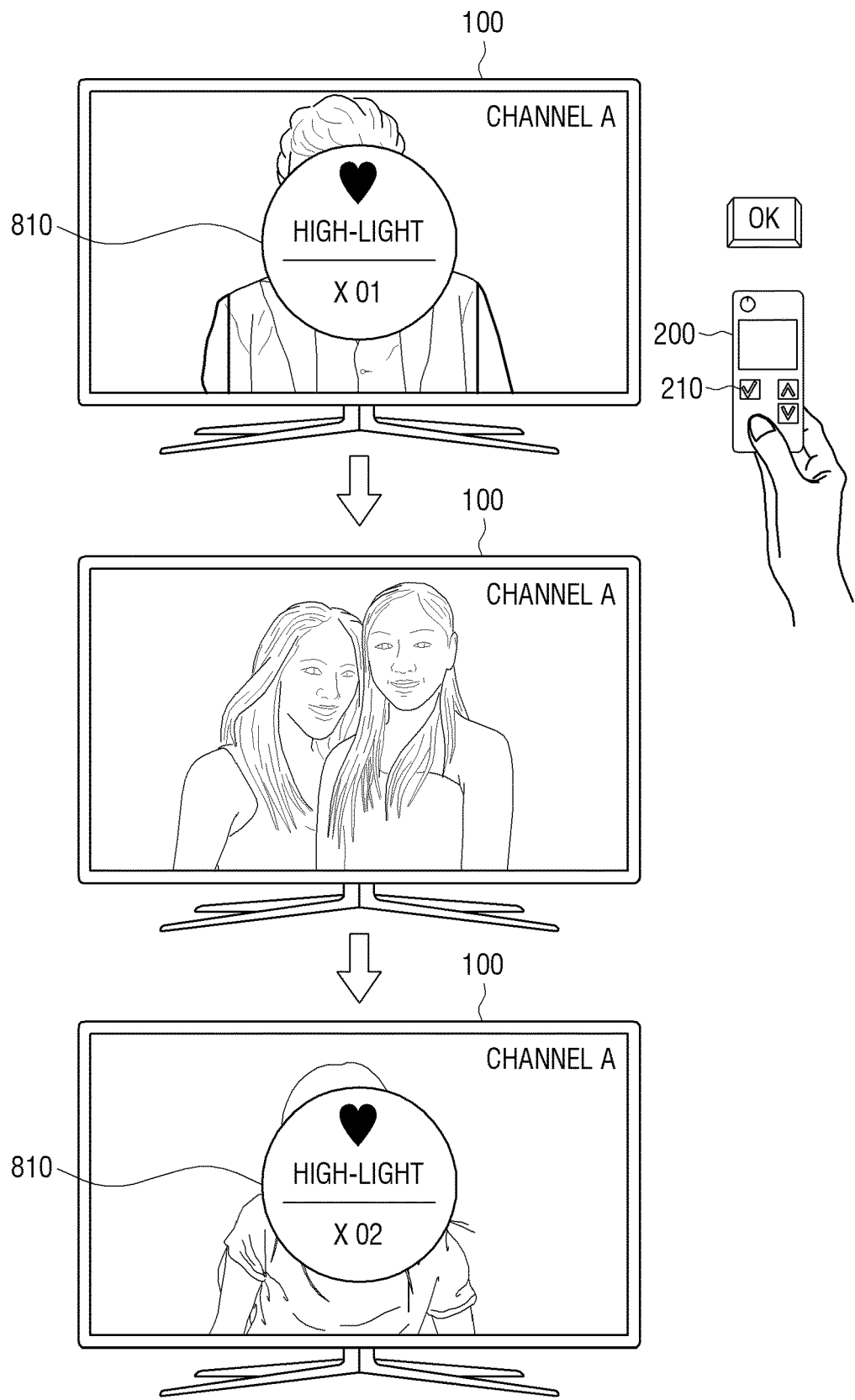

FIG. 8 is a diagram illustrating a method for check-in interaction according to another exemplary embodiment.

By using a method which is illustrated in FIG. 8, a user may input a check-in interaction on each scene within the contents.

For example, when a specific program is being broadcasted, a user may input check-in interaction using a preset button 210 which is provided on the remote controller 200 or a touch pad. In this case, the check-in interaction may be input using a method which is different from the check-in method which is described in FIG. 4. For example, the check-in interaction may be input through a different button, a different motion, a different vocal command, and the like.

In this case, a GUI 810 which indicates that the check-in interaction on a specific scene is input may be overlapped with an image which is displayed on a screen. The GUI 810 may include the number of input of the check-in interaction on the specific scene in the corresponding program. For example, in the GUI 810 which is displayed on a screen according to the check-in interaction on the specific scene, a number which indicates that the check-in interaction in the corresponding program is input for two times may be illustrated.

The check-in interaction information which is input using the aforementioned method may be used to calculate the degree of a user preference on the specific contents illustrated in FIG. 4A.

<Provision of a Poll UI>

Figure 9:
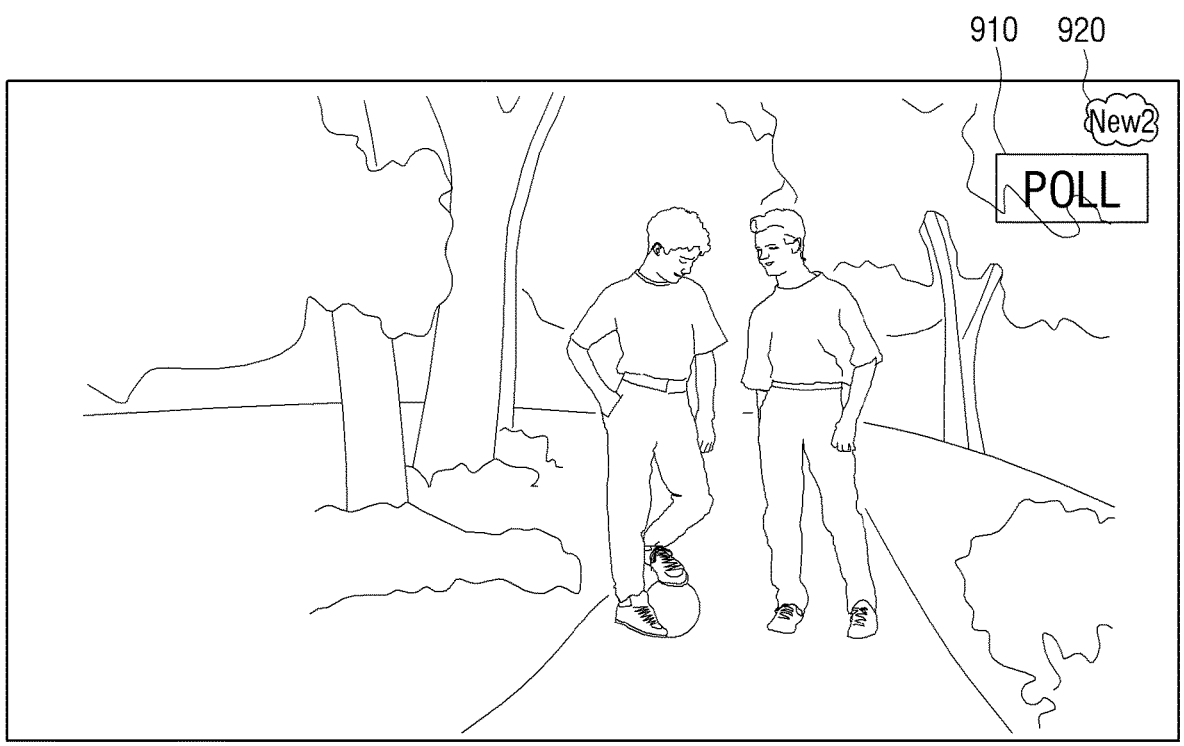
FIGS. 9-10D are diagrams illustrating a method for providing a poll UI according to exemplary embodiments.
Figure 10A:
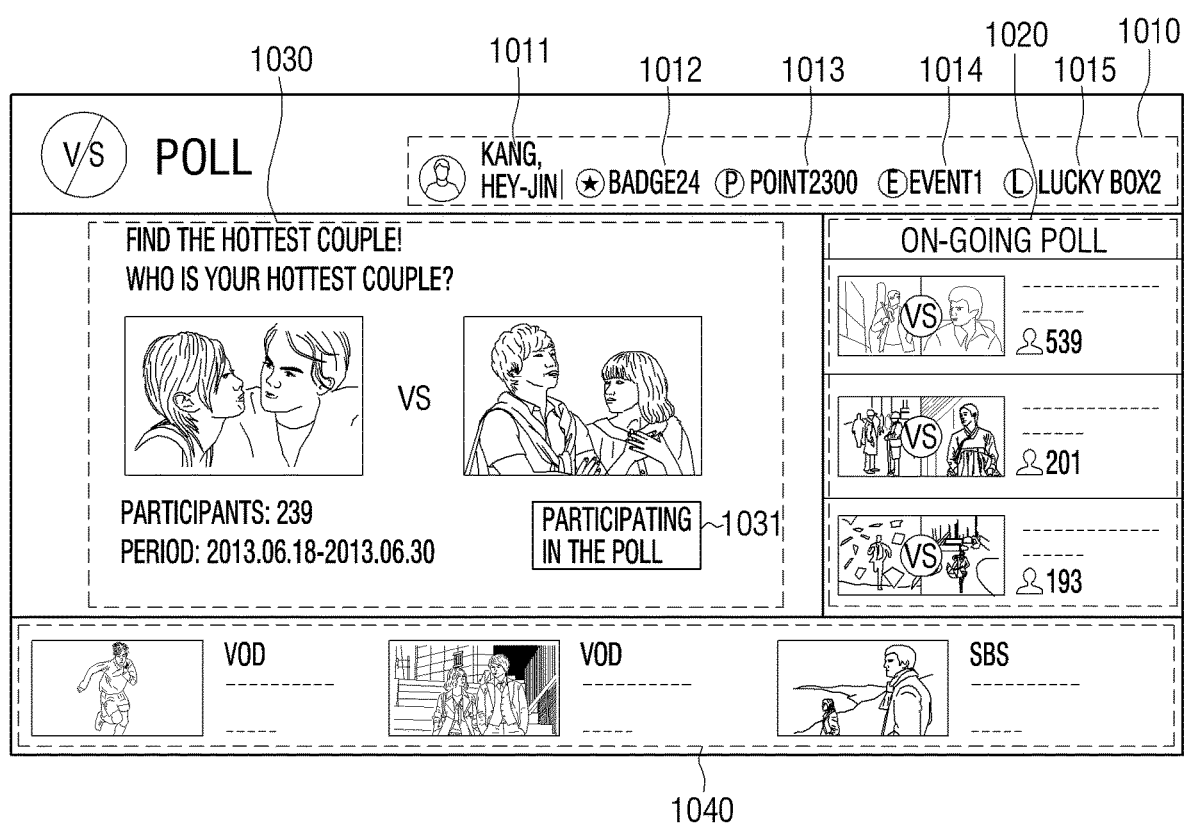
Figure 10B:
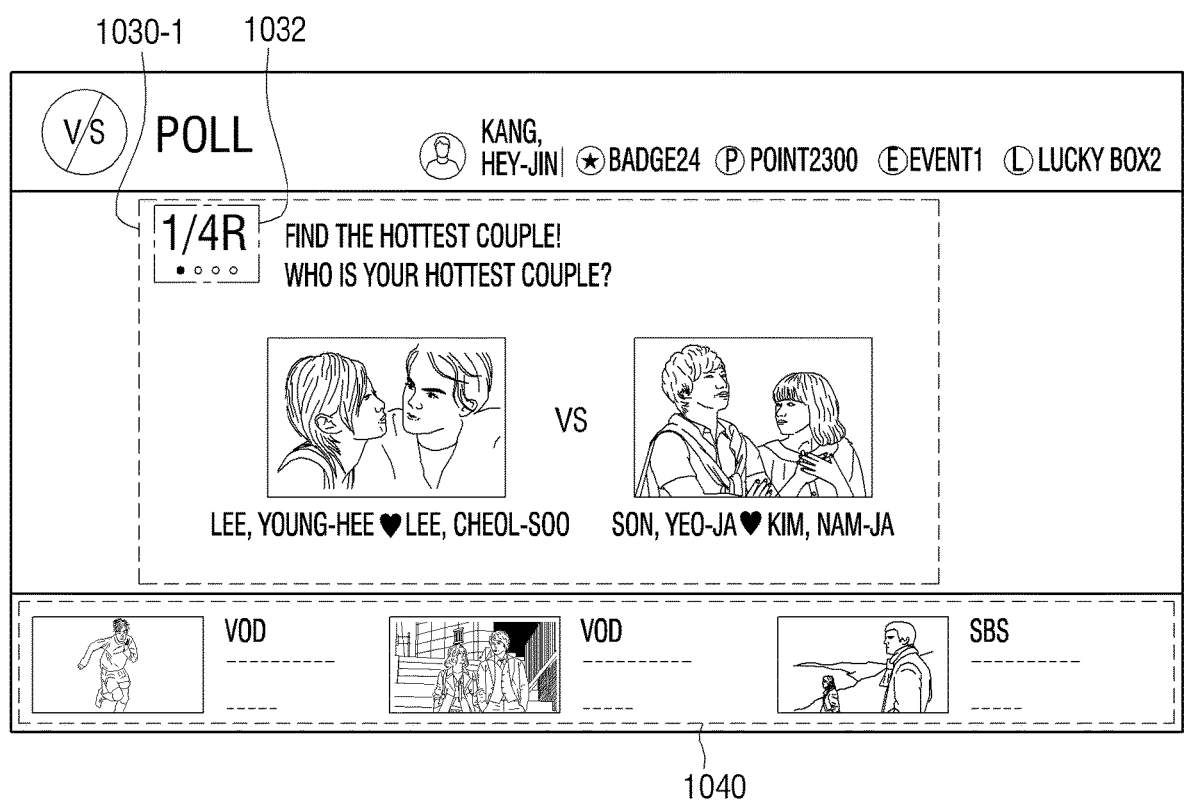
Figure 10C:
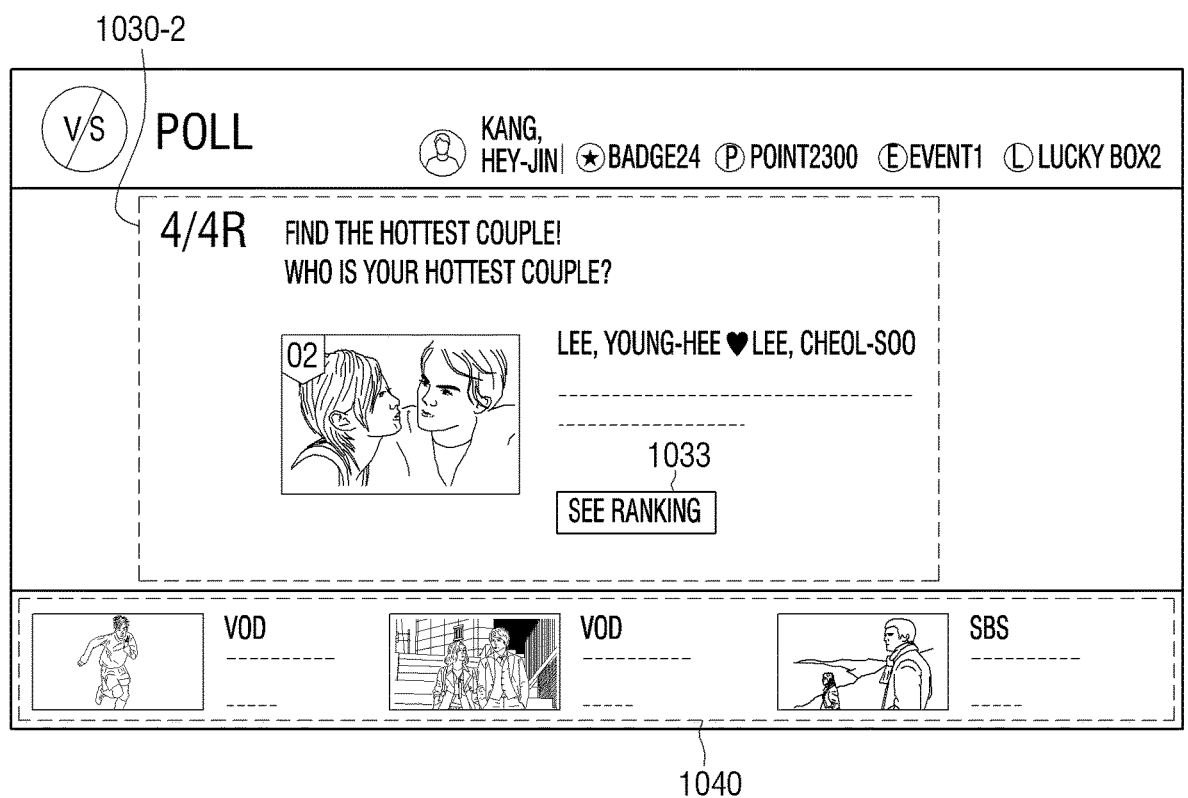
Figure 10D:
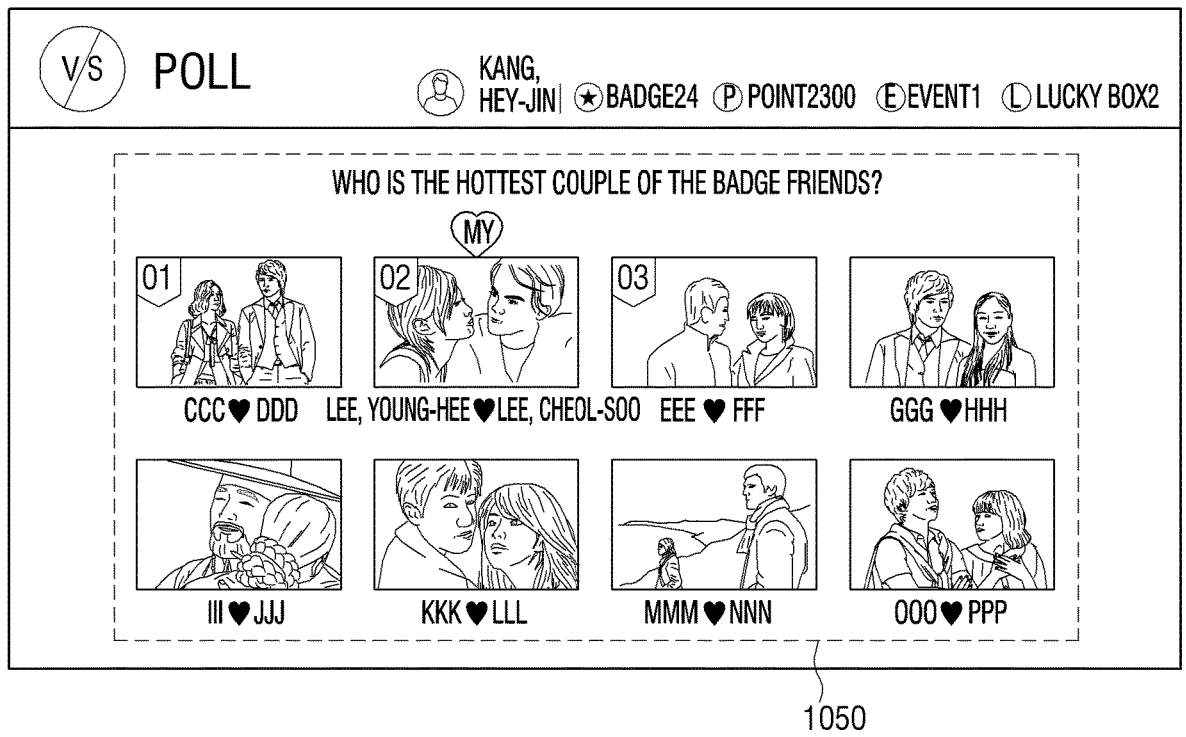

FIGS. 9-10D are diagrams illustrating a method for providing a poll UI according to another exemplary embodiment.

According to FIG. 9, the display apparatus 100 includes a poll screen display icon 910 and a new poll screen alarm icon 920 on an upper right side of a screen as a poll screen-related UI.

The poll screen display icon 910 is an icon which when selected performs a command to display the poll screen transmitted by the server device 200 on a screen of the display apparatus 100. Therefore, when the poll screen display icon 910 is selected, the display apparatus 100 displays the poll screen that is transmitted from the server device 200.

The new poll screen alarm icon 920 is an icon that is used to indicate that the display apparatus 100 receives a new poll screen from the server device 200.

For example, at the server device 200, when a new poll is generated according to a user's viewing history information, a command to transmit a poll screen may be input to the server device 200 by a user of the server device 200. As another example, when a preset time cycle to transmit the poll screen by the server device 200 nears, the server device 200 may transmit the poll screen to the display apparatus.

Accordingly, the display apparatus 100, when the currently received poll screen is different from any of the prestored poll screens, may indicate a new poll screen using a new poll screen alarm icon 920. FIG. 9 indicates that there are two new poll screens.

The poll-related UI which is provided on the display apparatus 100 as illustrated in FIG. 9 is merely exemplary, and thus, the UI may be of any format which can indicate a poll screen which is received from the server device 200.

FIGS. 10A to 10D illustrate a poll screen according to an exemplary embodiment. For example, when the poll screen display icon 910 is selected on the screen of the display apparatus as shown in FIG. 9, the poll screens as illustrated in FIGS. 10A to 10D may be displayed on the display apparatus.

FIG. 10A illustrates an exemplary embodiment of an initial poll screen which is displayed on the display apparatus 100. According to FIG. 10A, the initial poll screen may include poll screen viewer information 1010, on-going poll 1020, poll 1030, and relevant data 1040.

The poll screen viewer information 1010 may indicate various types of information related to a viewer of the current poll screen. For example, the poll screen viewer information 1010 may include icons on a viewer ID 1011, a badge 1012, a point 1013, an event 1014, and a lucky box 1015.

The viewer ID 1011 may include a photo and a name of a viewer that views the poll screen through the display apparatus 100, and indicate who is a viewer that has participated in the poll. For example, when a viewer registers the poll providing service provided by the server device 200, the viewer may register their own name, and this registered name or a photo may be displayed on the viewer ID 1011 on the poll screen.

The badge 1012 indicates the number of a viewer's participation in the poll, and the point 1013 indicates scores in a mileage format which the viewer obtains by participating in the poll. For example, the point 1013 may be obtained, when the number of people that participate in a poll exceeds a preset number, or when a candidate who the viewer selects on the poll screen tops the poll results. Participation into the poll may be encouraged by enabling a viewer to use the point as if it is cash or otherwise currency, when the viewer selects relevant data and uses a charged service.

The event 1014 may indicate the number of the poll screens in which events such as giving a certain point for participation in a poll are added.

A lucky box 1015 may be used to indicate the number of lucky draws which may be converted to points or may be used for using charged relevant data 1040 at a discounted price. For example, on a viewer's birthday, a lucky draw may be granted.

Accordingly, in an example of the information of the poll screen viewer of FIG. 10A, a viewer named "Kang, Hey-jin" participated in polls by an amount of 24 times, obtained 2300 points, that there is a one poll screen with an event, and there are two lucky draws in a lucky box.

The on-going poll 1020 may exclude a poll with which a viewer has already participated, from among the poll screens which are received from the server device 200 and stored in the display apparatus 100. For example, the on-going poll may indicate a poll screen to which a viewer can participate, as a due date that is not yet elapsed. Therefore, a user may intuitively check an available poll to participate.

In the example of FIG. 10A, the on-going poll 1020 excludes the poll screen viewer information and relevant data from among the configurations of each poll theme and merely indicates a poll such that a viewer may intuitively know which poll the user may participate in and how many viewers have participated in the poll.

The poll 1030 is a screen which is configured such that the viewer may select information using basic data which corresponds to the poll theme based on viewer history and is provided to the display apparatus 100.

According to the example of FIG. 10A, couples in two soap operas are representative candidates, and a poll asks participation of a viewer regarding a poll theme, "Find the hottest couple!, and, Who is your hottest couple?"

In this example, the poll 1030 implies that there is content which connects images or thumbnails of the couples by "VS" so that a viewer can select one. The poll provides relevant information by indicating a poll theme, a poll participation period, and a number of participants to the same poll with text so that a viewer may determine whether or not to participate in the poll.

When a viewer wishes to participate in the poll, the viewer may participate by selecting an icon named "Participating in the POLL 1031".

When the viewer selects the icon named "Participating in the POLL 1031," the display apparatus 100 displays the poll screen of FIG. 10B so that the viewer may participate in the selected poll.

For example, according to FIG. 10B, the viewer "Kang, Hey-jin" selects and participates in the poll, "Find the hottest couple! Who is your hottest couple?", and therefore, the on-going poll 1020 is not displayed.

In case of a poll 1030-1 of FIG. 10B, the icon "participating in the POLL" icon is not displayed unlike the poll 1030 of FIG. 10A, as the viewer "Kang, Hey-jin" already participates in a poll, and thus, it is not necessary that the "participating in the POLL" icon be displayed.

In addition, the icon illustrated as ¼R 1032 indicates that there is a total of four rounds on the poll theme, and the current round is the first round. In this example, regarding the poll theme of "Find the hottest couple! Who is your hottest couple?" there are a total of eight couples and a tournament type poll is on-going so that one out of two couples is selected for each round in a tournament style.

A poll 1030-2 of FIG. 10C is a part of the screen which indicates a result of participation in a poll up to four rounds. In this example, the viewer "Kang, Hey-jin" selects "Lee, Young-hee and Lee, Cheol-soo" regarding a poll theme. As such the result of the viewer's participation in a poll may be transmitted to the server device 200 and be stored in the server device 200.

The above-described configuration of the poll of the poll participation method is merely exemplary, and is not limited thereto. For example, all of the candidates may be displayed on one screen, and a viewer may select one of the candidates.

In addition, the poll 1030-2 may include a see ranking 1033 icon, and, when the see ranking 1033 icon is selected, a poll result screen which indicates the ranking of the candidate selected by the viewer may be displayed.

For example, when the see ranking 1033 icon is selected in the example illustrated in FIG. 10C, a poll result 1050 screen of FIG. 10D is displayed. In this example, the couple "Lee, Young-hee and Lee, Cheol-soo" selected by the viewer "Kang, Hye-jin" is ranked in second place out of a total of eight couples.

The server device 200 may combine the poll participation results on the same poll which is stored in the storage 220, generate the poll results, and transmit the results to the display apparatus.

For example, the poll result 1050 screen may be provided by combining the viewer's participation results when the viewer selects the see ranking 1033 icon, or the see ranking 1033 icon may be provided when the poll participation period is elapsed, and the final poll result may be provided.

The poll screen includes relevant data 1040. Referring to FIGS. 10A-10C, the various relevant data 1040 which is related to the poll is configured on the poll screen. The relevant data is related to the poll theme and indicates data that includes contents which a viewer may purchase or consume.

In the examples of FIGS. 10A to 10C, data which is linked to a VOD related to the poll is displayed. When a viewer selects the first relevant data from among the relevant data 1040, information on the selection is transmitted to the server device 200, and accordingly, the server device 200 may send a request to the contents providing apparatus which provides the first relevant data so that the VOD linked to the selected relevant data may be provided to the display apparatus.

In an example of FIGS. 10A to 10C, an example in which the relevant data is linked to the VOD is illustrated, but the example of the relevant data is not limited thereto. For example, the relevant data may be an advertisement screen related to the poll. For example, a website for purchasing the product may be provided by the selection of the relevant data by the viewer.

Figure 11A:
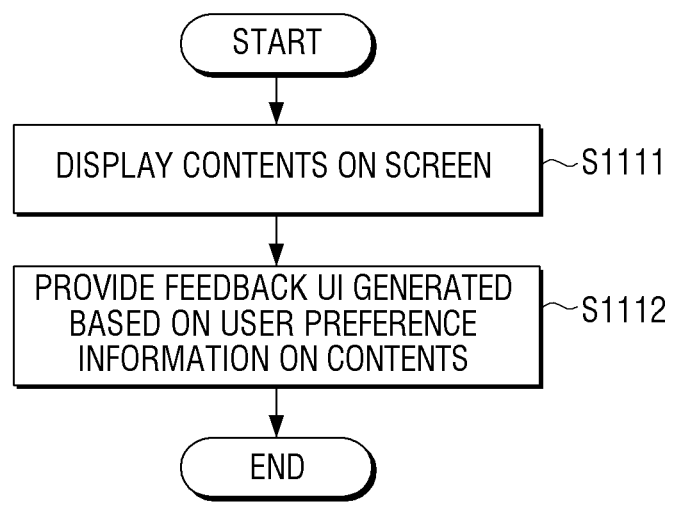
FIGS. 11A to 11B are flowcharts illustrating a method for controlling a display apparatus and a server according to exemplary embodiments.
Figure 11B:
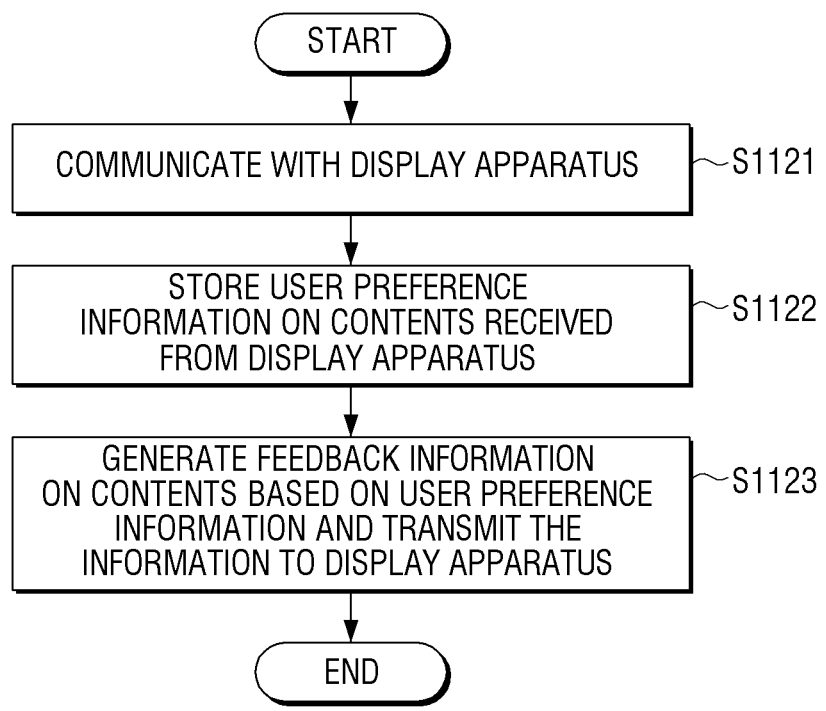

FIGS. 11A to 11B are flowcharts illustrating a method for controlling a display apparatus and a server according to an exemplary embodiment.

According to a method for controlling a display apparatus illustrated in FIG. 11A, contents are displayed on a screen (S1111).

Then, the feedback UI which is generated based on the user preference information on the contents is displayed on a screen (S1112). For example, the feedback UI may include at least one of the poll UI related to the contents or the control UI that is used to control the contents playback timing.

In this example, at S1112, the control UI including the time bar to control the contents playback timing and the preset GUI at a timing which corresponds to at least one scene of the contents on the time bar may be displayed. For example, the preset GUI may include information on a user preference on the at least one scene of the contents.

Or, at S1112, the poll UI that includes basic information which corresponds to the poll theme generated based on user preference information and information relevant to the basic information may be displayed.

According to a method of controlling the server device illustrated in FIG. 11B, communication is performed with the display apparatus first (S1121).

Then, the user preference information on the contents received from the display apparatus is stored (S1122).

Based on the user preference information, the feedback information on the contents is generated and transmitted to the display apparatus (S1123). For example, the feedback information may be information that is used to provide at least one of the poll UI which is related to the contents and the control UI to control the playback timing of the contents.

For example, at S1123, the feedback information which includes at least one scene and a number of empathic users which are detected based on user preference information on each scene of the contents may be transmitted to the display apparatus so that the control UI may be provided.

At S1123, when the user preference information is received from the display apparatus, the basic information that corresponds to the poll theme that is determined according to the user preference information and the information relevant to the basic information may be transmitted to the display apparatus such that the poll UI may be provided.

In addition, when the result of participation to the poll by a viewer is received from the display apparatus, the poll results may be generated by integrating the participation results of the viewer, and may be transmitted to the display apparatus.

Figure 12:
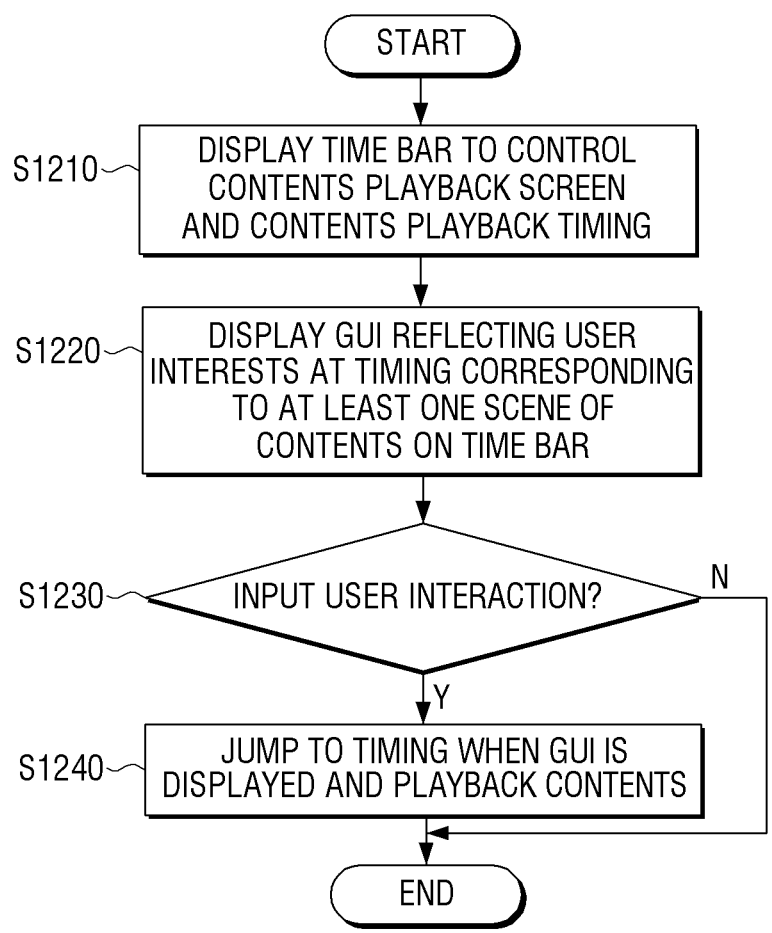
FIG. 12 is a flowchart illustrating a method for controlling a display apparatus according to another exemplary embodiment.

FIG. 12 is a flowchart illustrating a method for controlling a display apparatus according to another exemplary embodiment.

According to a method for controlling the display apparatus illustrated in FIG. 12, the time bar to control the contents playback screen and the contents playback timing is displayed in (S1210).

Then, at a timing which corresponds to at least one scene of the contents on the time bar, a GUI reflecting a user preference is displayed (S1220).

When a user interaction is input (S1230: Y), the contents jump to a point in which the preset GUI is displayed, and the contents are played (S1240).

Here, the user interaction may be a user pressing a direction key provided on a remote control apparatus.

In addition, the information on the user preference may include the number of empathic users that have indicated a preference on at least one scene of the contents.

In this case, the user preference may be calculated based on at least one of the SNS sharing information of each scene of the contents and information on a user interaction to display a user preference.

Here, the at least one scene in which the user preference is reflected may be a scene in which the user preference satisfies a preset condition. For example, the at least one scene may be detected based on at least one of a case where a user preference is more than a preset criterion or a case in which a user preference increases more than a preset ratio.

In addition, information about at least one scene which is detected based on a user preference on each scene of the contents and the number of empathic users may be received from an external server. Also, based on the received information, the jumping point may be calculated based on the time bar.

As described above, according to one or more exemplary embodiments, a GUI which reflects feedback of several users on the contents scene may be provided on a contents playback screen. Accordingly, a user may selectively view a highlight image to which multiple user feedback is reflected in a context of an entire image. Accordingly, a user may have an experience to view an entire image in a compressive manner.

Figure 13:
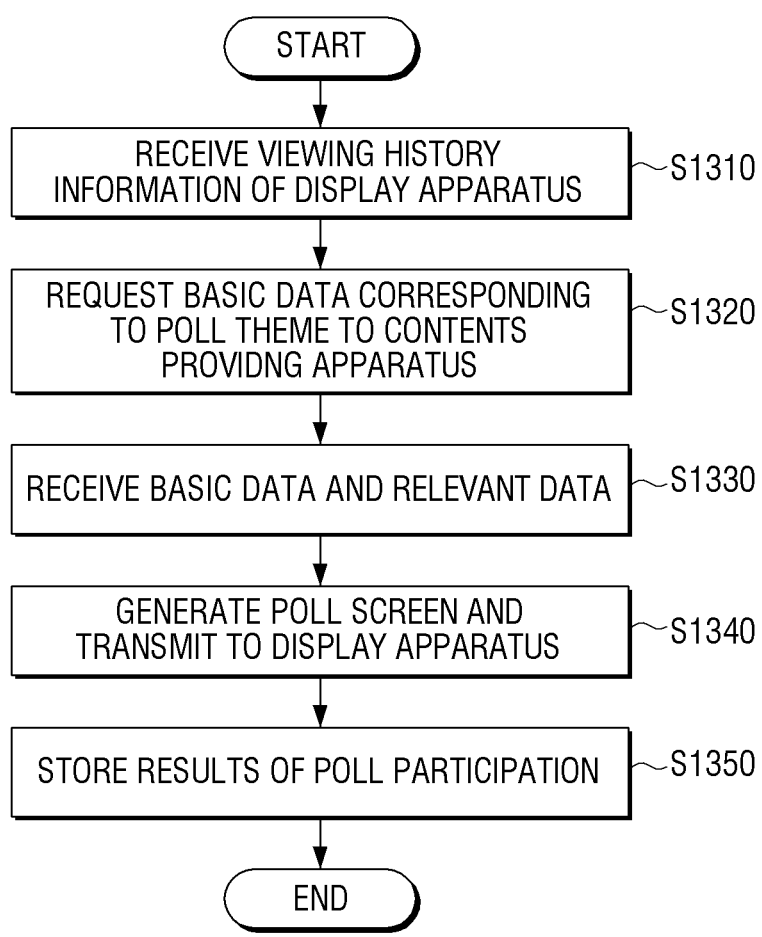
FIG. 13 is a flowchart illustrating a method for controlling a server according to another exemplary embodiment.

FIG. 13 is a flowchart illustrating a method for controlling a server according to another exemplary embodiment.

According to a method of controlling of a server device as illustrated in FIG. 13, when the viewing history information of the display apparatus is received (S1310), the server device may determine the poll theme according to the received viewing history information, and request basic data corresponding to the determined poll theme from the contents providing apparatus (S1320).

As an example, when basic data and relevant data are received from the contents providing apparatus (S1330), a poll is generated using the basic data, and a poll screen which includes the generated poll and the relevant data may be generated. Then, the generated poll screen is transmitted to the display apparatus (S1340).

When a viewer participates in a poll, and the results of participation are transmitted from the display apparatus, the results are received and stored (S1350).

Figure 14A:
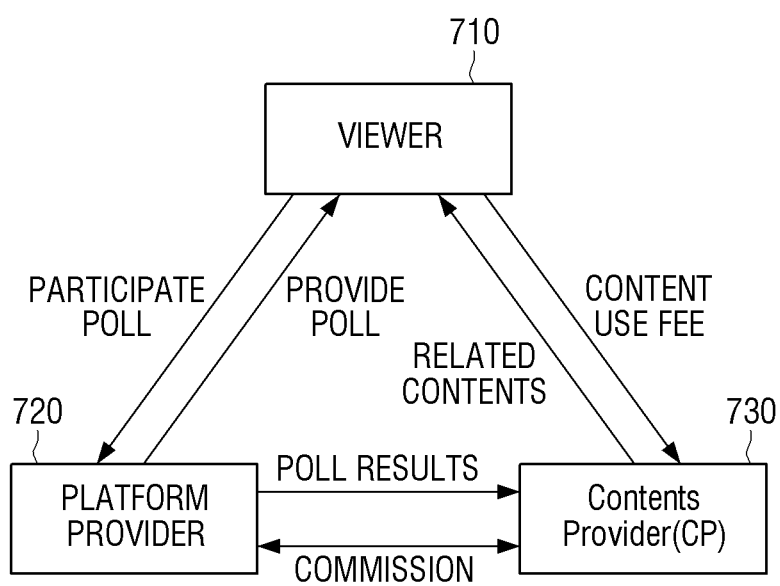
FIGS. 14A-14B are diagrams illustrating a business model using a method for providing a poll according to exemplary embodiments.

FIG. 14A is a diagram illustrating a business model using a method for providing a poll according to an exemplary embodiment.

According to FIG. 14A, a business model may include three subjects such as a viewer 710, a contents provider (CP) 730, and a platform provider 720.

The platform provider 720 receives contents from the CP 730, generates the poll, provides the viewer 710 with the poll, and provides the CP with the poll results. Accordingly, the CP 730 may receive information on the desired contents of a viewer.

The poll screen includes not only the poll but also the relevant data, and therefore, in a process in which the viewer 710 participates in a poll, related contents which the CP provides with a charge are exposed to the viewer 710. Accordingly, a possibility of use of the relevant contents of the viewer 710 increases in the process of participating a poll.

Accordingly, when the viewer 710 uses relevant contents, the CP 730 may obtain a fee for use the contents.

The platform provider 720, in the process of providing the poll screen and the poll results, may obtain profits, such as a commission, from the CP 730 regarding the fee for using the contents by the viewer 710.

Meanwhile, a viewer may have fun while participating in a poll, and may know other viewers' opinions on the same poll theme through the poll results.

Figure 14B:
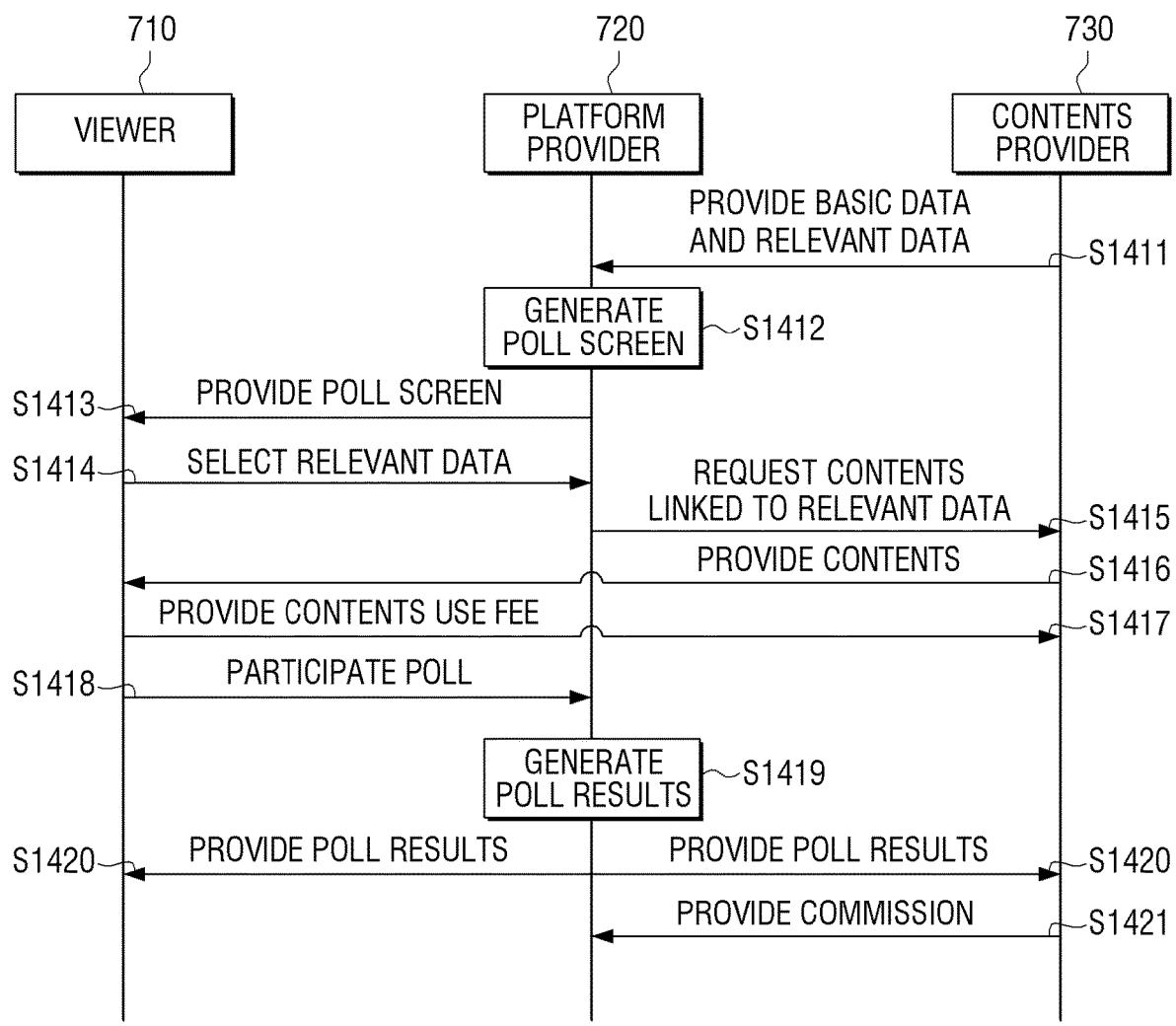

A business model of FIG. 14A is described through FIG. 14B.

According to FIG. 14B, when the CP 730 provides the platform provider 720 with the basic data to generate a poll screen and relevant information (S1411), the platform provider 720 generates a poll screen using the information (S1412), and provides the poll screen to the viewer 710 (S1413).

When the viewer which receives the poll screen the viewer selects relevant data on the poll screen (S1414), and the platform provider 720 receives the data and requests to the CP 730 the contents linked to relevant data (S1415).

Then, the CP 730 provides the contents to the viewer 710 (S1416), and receives a fee for using the contents from the viewer 710 (S1417).

Meanwhile, the viewer 710 who receives the poll screen participates in the poll (S1418), the platform provider 720 generates the poll results (S1419), and provides the poll results to the CP 730 and the viewer 710 (S1420).

In return for performing this process, the platform provider 720 receives from the CP 730 the profits from the fee for using the contents of the viewer 710, for example, commission (S1421).

Figure 15:
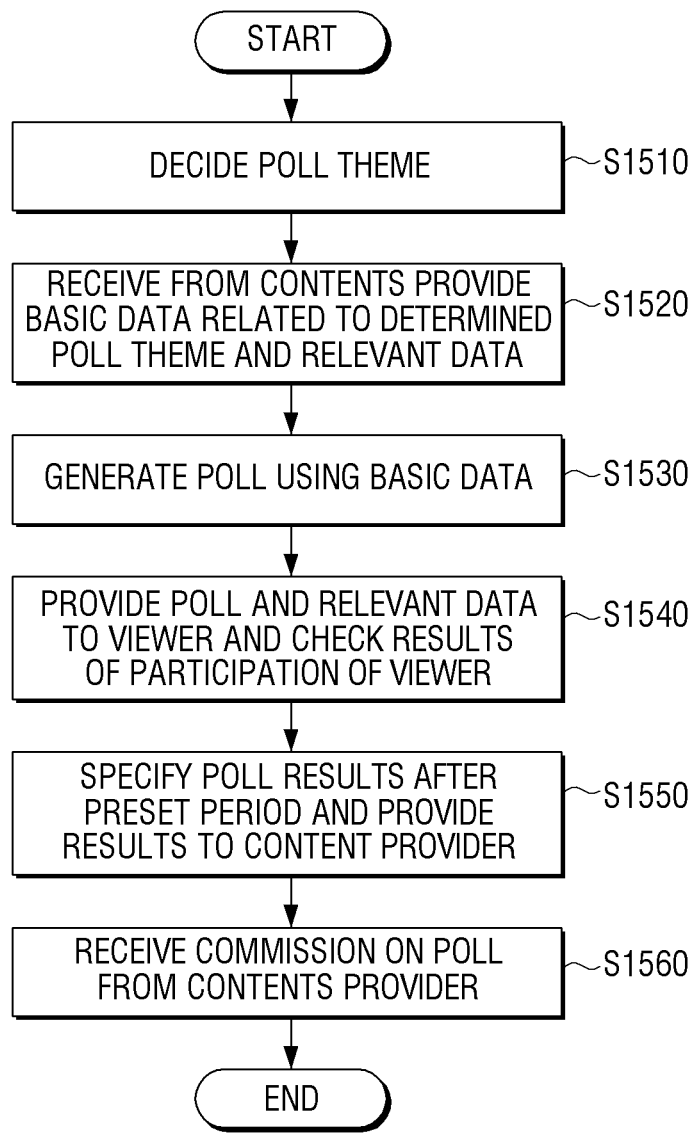
FIG. 15 is a flowchart illustrating a business model using a method for providing a poll according to an exemplary embodiment.

FIG. 15 is a flowchart illustrating a business model using a method for providing a poll according to an exemplary embodiment. Through FIG. 15, a business model using a method for proving a poll is described centering on a platform provider.

According to FIG. 15, the platform provider decides a poll theme (S1510), and receives basic data related to the poll theme and relevant information from the at least one CP (S1520).

Then, the platform provider generates a poll using the basic data (S1530), provides the viewer with the generated poll and the relevant information, and checks the results of participation of a viewer on the poll (S1540). In addition, based on the results of the participation of the viewer, the poll results are specified, and the poll results are provided to the CP (S1550).

As relevant information is exposed while the platform provider performs the above-described process, a chance of the CP to obtain profits may increase, and thus, the platform provider may receive certain profits through a contract with the CP (S1560).

According to one or more of the exemplary embodiments a method for providing a poll of a server apparatus, and a server apparatus for providing a poll, a user of the display apparatus may receive a poll regarding a theme that the user is interested in, and have fun through participation in a poll. Through the poll results, a user may find out other users' opinions on the poll theme, and the CP may provide efficient poll, and have an effect to increase a chance of purchasing the contents of a user.

As described above, according to the various exemplary embodiments, a UI which reflects a user preference in various methods may be provided, and consequently user convenience is improved.

According to an exemplary embodiment, a method for providing a UI may be implemented such that the method may be performed using a software application through which a user may directly use on OS. In addition, the application may be provided as an icon interface on a screen of the display apparatus 100, but is not limited thereto.

A method for controlling a display apparatus according to various exemplary embodiments may be implemented as a program code executable via computer, stored in various non-transitory computer readable medium, and provided to each server or apparatus.

For example, a non-transitory computer readable medium in which the configuration of calculating user preference on at least one scene of the contents is stored may be provided to a server.

A non-transitory computer readable medium may be provided which stores a program to operate the above-described signal processing methods according to an exemplary embodiment.

The non-transitory recordable medium refers to a medium which may store data semi-permanently or permanently rather than storing data for a short time such as a register, a cache, and a memory, and may be readable by an apparatus. Specifically, this medium may be a non-temporal recordable medium such as compact disk (CD), a digital versatile disk (DVD), hard disk, Blu-ray disk, universal serial bus (USB), memory card, or read-only memory (ROM), not being limited thereto.

The foregoing embodiments and advantages are merely exemplary and should not be construed as limiting the inventive concept. Also, the description of the exemplary embodiments of the inventive concept is intended to be illustrative, and not to limit the scope of the claims, and many alternatives, modifications, and variations will be apparent to those skilled in the art.

What is claimed is:

1. A display apparatus comprising:
a display; and
a processor configured to:
control the display to display content and a time bar that is used to control a playback time point of the content;
receive user preference information including a number of users that have expressed a preference for each scene of the content; and
based on at least one of a length of an area of the content where a level of the preference sustains for a certain criterion or more being over the certain criterion, or a relative level of the preference for the area increasing greater than a certain increase ratio, control the display to display a graphical user interface (GUI) element corresponding to a starting point of the area at a corresponding position on the time bar, wherein the processor is further configured to, in response to receiving a user input for moving an indicator on the time bar, move the indicator to the starting point of the area, and control a current playback time point to be moved to a scene of the content corresponding to the starting point of the area.

2. The display apparatus of claim 1, wherein the GUI element includes displayed information indicating the number of users that have expressed the preference for the respective scene of the content.

3. The display apparatus of claim 1, wherein the user input is received through one or more of: a remote controller, a camera, a microphone, or a touch screen interface.

4. The display apparatus of claim 1, wherein the user preference information includes information of a user interaction with each scene of the content, which corresponds to a user expressing the preference in the each scene of the content.

5. The display apparatus of claim 1, wherein the user preference information is obtained from at least one of: a social networking service (SNS) sharing information on one or more scenes of the content and information on one or more interactions with the one or more scenes of the content, the shared information including a number of users that have captured, replied to, voted on, shared or uploaded the respective scene of the content via the SNS, and the one or more interactions being a number of users who input an interaction with the respective scene of the content.

6. The display apparatus of claim 1, wherein the user preference information is obtained based on at least one of: a social networking service (SNS) sharing information on one or more scenes of the content and user interaction information indicating users expressing one or more preferences for the one or more of the scenes of the content in the SNS.

7. The display apparatus of claim 1, wherein the processor is further configured to control the display to display information related to the number of users that have expressed the preference for at least two scenes of the content at a starting point of an image area corresponding to the at least two scenes of the content.

8. The display apparatus of claim 1, further comprising:
a communication interface configured to communicate with an external server, wherein the processor is further configured to control the communication interface to receive, from the external server, the user preference information and information including a number of empathic users that have expressed a preference for the each scene of the content.

9. The display apparatus of claim 8, wherein the processor is further configured to control the display to display a poll user interface (UI) which includes basic information corresponding to a poll that is generated based on the user preference information.

10. The display apparatus of claim 9, wherein the poll UI comprises a first area which includes the basic information that corresponds to the poll, a second area that includes relevant information, and a third area that includes information regarding another poll, which is an on-going poll.

11. The display apparatus of claim 9, wherein, in response to relevant information being selected on the poll UI, the processor is configured to control the communication interface to receive, from the external server, contents linked to the selected relevant information, and control the display to display the received contents linked to the selected relevant information.

12. The display apparatus of claim 9, wherein the user preference information further comprises at least one of: preferred contents information, viewing time information, preferred broadcasting station information, preferred genre information, viewers' age information, and viewers' gender information.

13. A server apparatus comprising:
a communication interface configured to communicate with a display apparatus;
a memory that stores user preference information; and
a processor configured to:
receive user preference information including a number of users that have expressed a preference for each scene of content; and
based on at least one of a length of an area of the content where a level of the preference sustains for a certain criterion or more being over the certain criterion, or a relative level of the preference for the area increasing greater than a certain increase ratio, generate a control user interface (UI) that is used to control playback of the content, and control the communication interface to transmit the control UI to the display apparatus, wherein the control UI is configured to, control the display apparatus to display the control UI that is used to control the playback of the content, the control UI including a time bar and a graphical user interface (GUI) element corresponding to a starting point of the area at a corresponding position on the time bar,
wherein the control UI is further configured to control the display apparatus to, in response to receiving a user input for moving an indicator on the time bar, move the indicator to the starting point of the area, and control a current playback time point to be moved to a scene of the content corresponding to the starting point of the area.

14. The server apparatus of claim 13, wherein the control UI further includes the number of users that have expressed the preference for at least two scenes of the content on the time bar.

15. The server apparatus of claim 14, wherein the processor is further configured to control the communication interface to transmit, to the display apparatus, feedback information including information about the at least two scenes which is detected based on the user preference information on each scene of the content and the number of users that have expressed the preference for the at least two scenes of the content to enable the control UI to be provided.

16. The server apparatus of claim 13, wherein, in response to information on user information being received from the display apparatus, the processor is configured to control the communication interface to transmit, to the display apparatus, a poll user interface (UI) which includes basic information corresponding to a poll that is determined according to the user preference information and relevant information about the basic information to enable the poll UI to be provided.

17. The server apparatus of claim 16, wherein, in response to viewers' participation results on the poll being received from the display apparatus, the processor is further configured to generate a poll result by combining the viewers' participation results and transmit the generated poll result to the display apparatus.

18. A method for controlling a display apparatus, the method comprising:
displaying playback of a content and a time bar that is used to control a playback time point of the content, wherein the method further comprises:

receiving user preference information including a number of users that have expressed a preference for each scene of content; and based on at least one of a length of an area of the content where a level of the preference sustains for a certain criterion or more being over the certain criterion, or a relative level of the preference for the area increasing greater than a certain increase ratio, displaying a graphical user interface (GUI) element corresponding to a starting point of the area at a corresponding position on the time bar, wherein the method further comprises: in response to receiving a user input for moving an indicator on the time bar, moving the indicator to the starting point of the area, and controlling a current playback time point to be moved to a scene of the content corresponding to the starting point of the area.

19. A method for controlling a server apparatus, the method comprising:

receiving and storing user preference information corresponding to a number of users that have expressed a preference for each scene of a content; and based on at least one of a length of an area of the content where a level of the preference sustains for a certain criterion or more being over the certain criterion, or a relative level of the preference for the area increasing greater than a certain increase ratio, generating a control user interface (UI) that is configured to control playback of the content, and controlling a communication interface to transmit the control UI to a display apparatus, wherein the control UI is configured to, control the display apparatus to display the control UI that is used to control the playback of the content, the control UI including a time bar, and a graphical user interface (GUI) element corresponding to a starting point of the area at a corresponding position on the time bar, wherein the control UI is further configured to control the display apparatus to, in response to receiving a user input for moving an indicator on the time bar, move the indicator to the starting point of the area, and control a current playback time point to be moved to a scene of the content corresponding to the starting point of the area.

* * * * *